US012759166B2

(12) United States Patent
Miyakawa

(10) Patent No.: US 12,759,166 B2
(45) Date of Patent: Oct. 13, 2026

(54) MEASUREMENT DEVICE, ROBOT SYSTEM, MANAGEMENT METHOD, TARGET MEMBER, AND MEASUREMENT METHOD

(71) Applicant: NIKON CORPORATION, Tokyo (JP)

(72) Inventor: Tomoki Miyakawa, Kumagaya (JP)

(73) Assignee: NIKON CORPORATION, Tokyo (JP)

( * ) Notice: Subject to any disclaimer, the term of this patent is extended or adjusted under 35 U.S.C. 154(b) by 83 days.

(21) Appl. No.: 18/842,805

(22) PCT Filed: Mar. 10, 2022

(86) PCT No.: PCT/JP2022/010673

§ 371 (c)(1),
(2) Date: Aug. 30, 2024

(87) PCT Pub. No.: WO2023/170877

PCT Pub. Date: Sep. 14, 2023

(65) Prior Publication Data

US 2025/0170726 A1 May 29, 2025

(51) Int. Cl.
*B25J 13/08* (2006.01)
*G06T 7/73* (2017.01)

(52) U.S. Cl.
CPC ............... *B25J 13/089* (2013.01); *G06T 7/73* (2017.01); *G06T 2207/30204* (2013.01)

(58) Field of Classification Search
CPC .. B25J 13/089; B25J 9/10; B25J 19/02; G06T 7/73; G06T 2207/30204; G01B 11/26; G01B 11/00; G01B 11/002; G01B 11/03; G01S 17/42; G01S 17/875
USPC ........................................................ 700/259
See application file for complete search history.

(56) References Cited

U.S. PATENT DOCUMENTS

| | | | | |
|---|---|---|---|---|
| 5,903,459 | A | 5/1999 | Greenwood et al. | |
| 9,815,204 | B2 * | 11/2017 | Hull | B25J 9/1692 |
| 2012/0099119 | A1 | 4/2012 | Bridges et al. | |
| 2012/0168605 | A1 | 7/2012 | Milanovic | |
| 2012/0265479 | A1 * | 10/2012 | Bridges | G01C 3/08 702/135 |
| 2016/0327383 | A1 | 11/2016 | Becker et al. | |

(Continued)

FOREIGN PATENT DOCUMENTS

| | | | |
|---|---|---|---|
| EP | 4354079 | A1 | 4/2024 |
| JP | 07-332923 | A | 12/1995 |

(Continued)

OTHER PUBLICATIONS

Greenwood et al. (JP2012104136.translate); Method for Improving Accuracy of Machines. Boeing Co. (Year: 2012).*

(Continued)

*Primary Examiner* — B M M Hannan
(74) *Attorney, Agent, or Firm* — XSENSUS LLP

(57) ABSTRACT

A measurement device for a movable robot determines the robot's position along three axes and its rotation around these axes. The device includes an emission unit that emits measurement light to at least three reflective elements attached to the robot, a light receiving unit that captures the reflected light, and a position acquiring unit. The position acquiring unit gathers position information related to the robot's first, second, and third axes, as well as rotational position data around each of these axes, based on the received light reflections.

22 Claims, 20 Drawing Sheets

(56) References Cited

U.S. PATENT DOCUMENTS

| | | | |
|---|---|---|---|
| 2019/0111564 A1 | 4/2019 | Wang et al. | |
| 2020/0161154 A1* | 5/2020 | Sugita | H01L 21/68707 |
| 2021/0299861 A1 | 9/2021 | Yamaguchi et al. | |

FOREIGN PATENT DOCUMENTS

| | | |
|---|---|---|
| JP | 2012-104136 A | 5/2012 |
| JP | 2018-515774 A | 6/2018 |
| JP | 2019-049481 A | 3/2019 |
| JP | 2019-072780 A | 5/2019 |
| WO | 2007/002319 A1 | 1/2007 |

OTHER PUBLICATIONS

International Search Report and Written Opinion issued May 31, 2022 in International Patent Application No. PCT/ JP2022/010673 with English translation thereof.
European Search Report issued Dec. 11, 2025 in corresponding European Patent Application No. 22930858.0, 11 pages.
Japanese Office Action issued Apr. 28, 2026 in corresponding Japanese Patent Application No. 2024-505771, 14 pages.

* cited by examiner

MEASUREMENT DEVICE, ROBOT SYSTEM, MANAGEMENT METHOD, TARGET MEMBER, AND MEASUREMENT METHOD

CROSS-REFERENCE TO RELATED APPLICATION

The present application is a national stage application, pursuant to 35 U.S.C. § 371, of International Patent Application No. PCT/JP2022/010673, filed Mar. 10, 2022, the entire contents of which are incorporated herein by reference.

TECHNICAL FIELD

The present invention relates to a measurement device, a robot system, a management method, a target member, and a measurement method.

BACKGROUND ART

Processes of processing and assembling are automatically performed by robots and machine tools. In these processes, in order to improve the accuracy of processing and assembling, a position and a posture of an arm of a robot that is a control target need to be measured with high accuracy. For example, devices that measure a position of a predetermined part of a robot device using an external measurement device are known (Patent Document 1).

In control of a robot, it is required to measure a position and a posture of the robot with high accuracy.

CITATION LIST

Patent Literature

[Patent Literature 1]
PCT Publication No. 2007/002319

SUMMARY OF INVENTION

According to one aspect of the present invention, there is provided a measurement device measuring a position of a movable robot and a position of the robot in a rotation direction, the measurement device including: an emission unit capable of emitting measurement light to each of at least three reflective elements attached to the robot; a light receiving unit capable of receiving reflection light reflected on each of the three reflective elements; and a position acquiring unit acquiring position information relating to a first axis of the robot, position information relating to a second axis intersecting with the first axis, and position information relating to a third axis intersecting with the first axis and second axis and information relating to a position in a rotation direction around the first axis, information relating to a position in a rotation direction around the second axis, and information relating to a position in a rotation direction around the third axis on the basis of light reception results acquired by the light receiving unit.

According to one aspect of the present invention, there is provided a robot system including the measurement device described above.

According to one aspect of the present invention, there is provided a management method managing a robot using the measurement device described above.

According to one aspect of the present invention, there is provided a target member including a first reflective element, a second reflective element, and a third reflective element to which measurement light is emitted for acquiring position information relating to a first axis, position information relating to a second axis intersecting with the first axis, and position information relating to a third axis intersecting with the first axis and second axis, and information relating to a position in a rotation direction around the first axis, information relating to a position in a rotation direction around the second axis, and information relating to a position in a rotation direction around the third axis for a movable measurement target, in which the target member is able to be attached to the measurement target, and a first side joining a first position at which the first reflective element is disposed and a second position at which the second reflective element is disposed, a second side joining the second position and a third position at which the third reflective element is disposed, and a third side joining the third position and the first position have mutually-different lengths.

According to one aspect of the present invention, there is provided a measurement device measuring a position of a measurement target, the measurement device including: an emission unit capable of sequentially emitting measurement light to each of at least three reflective elements attached to the measurement target; a light receiving unit capable of sequentially receiving reflection light of the measurement light reflected on each of the three reflective elements; and an information acquiring unit acquiring information relating to a position of the measurement target on the basis of light reception results acquired by the light receiving unit.

According to one aspect of the present invention, there is provided a measurement device measuring a position of a measurement target, the measurement device including: an emission unit capable of emitting measurement light along an orbit that can pass through at least three reflective elements attached to the measurement target; a light receiving unit capable of receiving reflection light of the measurement light reflected on each of the three reflective elements; and an information acquiring unit acquiring information relating to the position of the measurement target on the basis of light reception results acquired by the light receiving unit.

According to one aspect of the present invention, there is provided a target member comprising a first reflective element, a second reflective element, and a third reflective element used for measuring a position of a measurement target, in which the target member is able to be attached to the measurement target, and a first side joining a first position at which the first reflective element is disposed and a second position at which the second reflective element is disposed, a second side joining the second position and a third position at which the third reflective element is disposed, and a third side joining the third position and the first position have mutually-different lengths.

According to one aspect of the present invention, there is provided a measurement method measuring a position of a movable robot and a position of the robot in a rotation direction, the measurement method including: emitting measurement light to each of at least three reflective elements attached to the robot; receiving reflection light reflected on each of the three reflective elements; and acquiring position information relating to a first axis of the robot, position information relating to a second axis intersecting with the first axis, and position information relating to a third axis intersecting with the first axis and second axis and information relating to a position in a rotation direction around the first axis, information relating to a position in a rotation direction around the second axis, and information relating to a position in a rotation direction around the third axis on the basis of light reception results acquired by the receiving of light.

According to one aspect of the present invention, there is provided a measurement method measuring a position of a measurement target, the measurement method including: sequentially emitting measurement light to each of at least three reflective elements attached to the measurement target; sequentially receiving reflection light of the measurement light reflected on each of the three reflective elements; and acquiring information relating to the position of the measurement target on the basis of light reception results acquired by the receiving of light.

According to one aspect of the present invention, there is provided a measurement method measuring a position of a measurement target, the measurement method including: emitting measurement light along an orbit that can pass through at least three reflective elements attached to the measurement target; receiving reflection light of the measurement light reflected on each of the three reflective elements; and acquiring information relating to the position of the measurement target on the basis of light reception results acquired by the receiving of light.

DESCRIPTION OF EMBODIMENTS

First Embodiment

Figure 1:
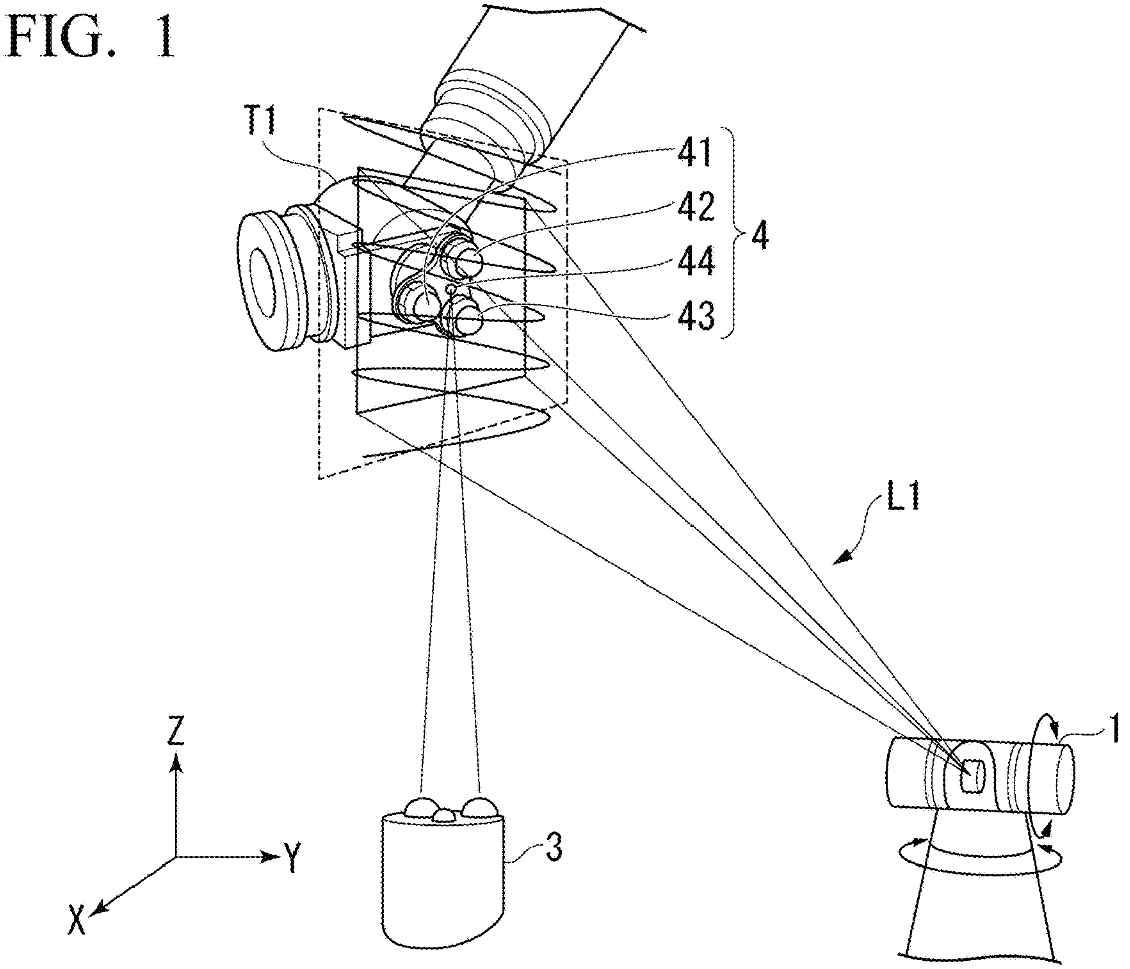
FIG. 1 is a diagram illustrating one example of an appearance in which a measurement device according to a first embodiment measures the position and the posture of a measurement target.

Hereinafter, a first embodiment will be described in detail with reference to the drawings. FIG. 1 is a diagram illustrating one example of an appearance in which a measurement device 1 according to this embodiment measures the position and the posture of a measurement target. The measurement device 1 measures the position of a measurement target that is able to move and the position in a rotation direction. The position in a rotation direction is also referred to as a posture, an orientation, or the like. In this embodiment, a measurement target of which a position and a posture are measured by the measurement device 1 is a robot T1 as one example. The robot T1 includes a movable art, that is, a part that is able to move. The position and the posture of the movable part of the robot T1 can be changed. In other words, the robot T1 is a robot that is able to move. The robot T1, for example, is a robot that performs the process of processing and assembling on a manufacturing site of a factory or the like.

In addition, one of the position and the posture of a measurement target may be fixed and not be changed. Furthermore, the position and the posture of a measurement target may be fixed and not be changed. In other words, a measurement target may be unable to move.

In addition, a measurement target may be a machine tool that is able to move or the like. Furthermore, a measurement target may be a processing head of a machining center, a tool attached to a processing head while being replaceable, or a member in which a member for measuring (a fixing tool) is fixed to a processing head separately from the tool attached to the processing head while being replaceable. In addition, a component configuring a large product at the time of assembling the large product such as an airplane, a measurement head of a three-dimensional measurement device, or the like may be set as a measurement target.

A target member 4 is mounted in the movable part of the robot T1. The target member 4 includes at least three reflective elements. In this embodiment, the target member 4 includes three reflective elements including a reflective element 41, a reflective element 42, and a reflective element 43. In addition, in this embodiment, the target member 4 includes a marker 44.

Figure 2:
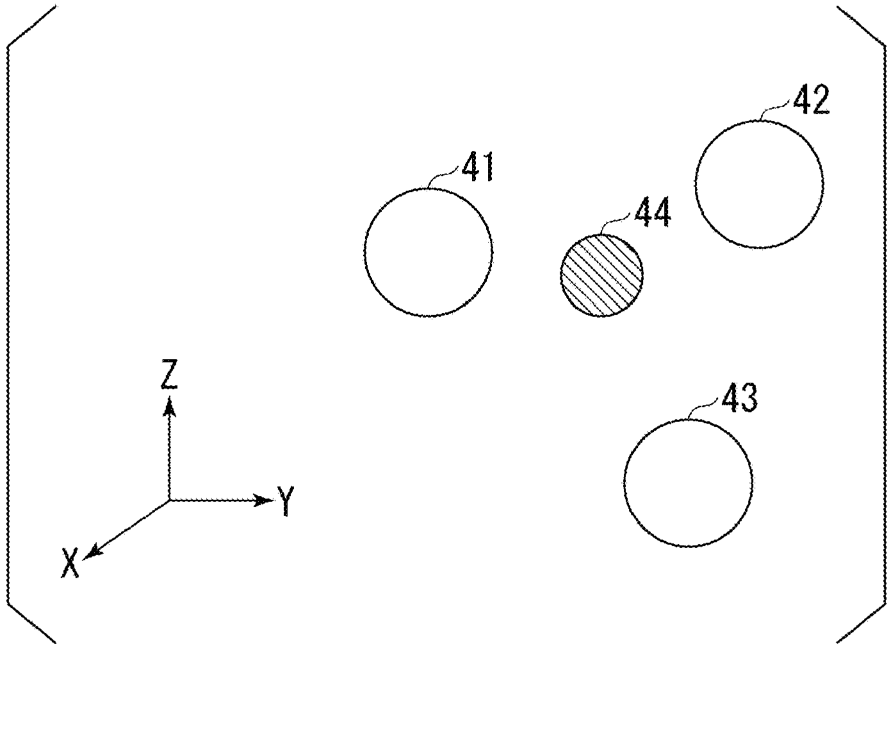
FIG. 2 is a diagram illustrating one example of arrangement of three reflective elements according to the first embodiment and a marker.

FIG. 2 illustrates one example of arrangement of these three reflective elements (the reflective elements 41, 42, and 43) and the marker 44. The marker 44 is arranged such that three reflective elements (the reflective elements 41, 42, and 43) are disposed near the marker 44. Being near the marker 44 is being in a range in which a distance from the marker 44 is a predetermined distance or less. As one example, the marker 44 may be either a light emitting body such as a light emitting diode (LED) or a non-light emitting body.

Figure 3:
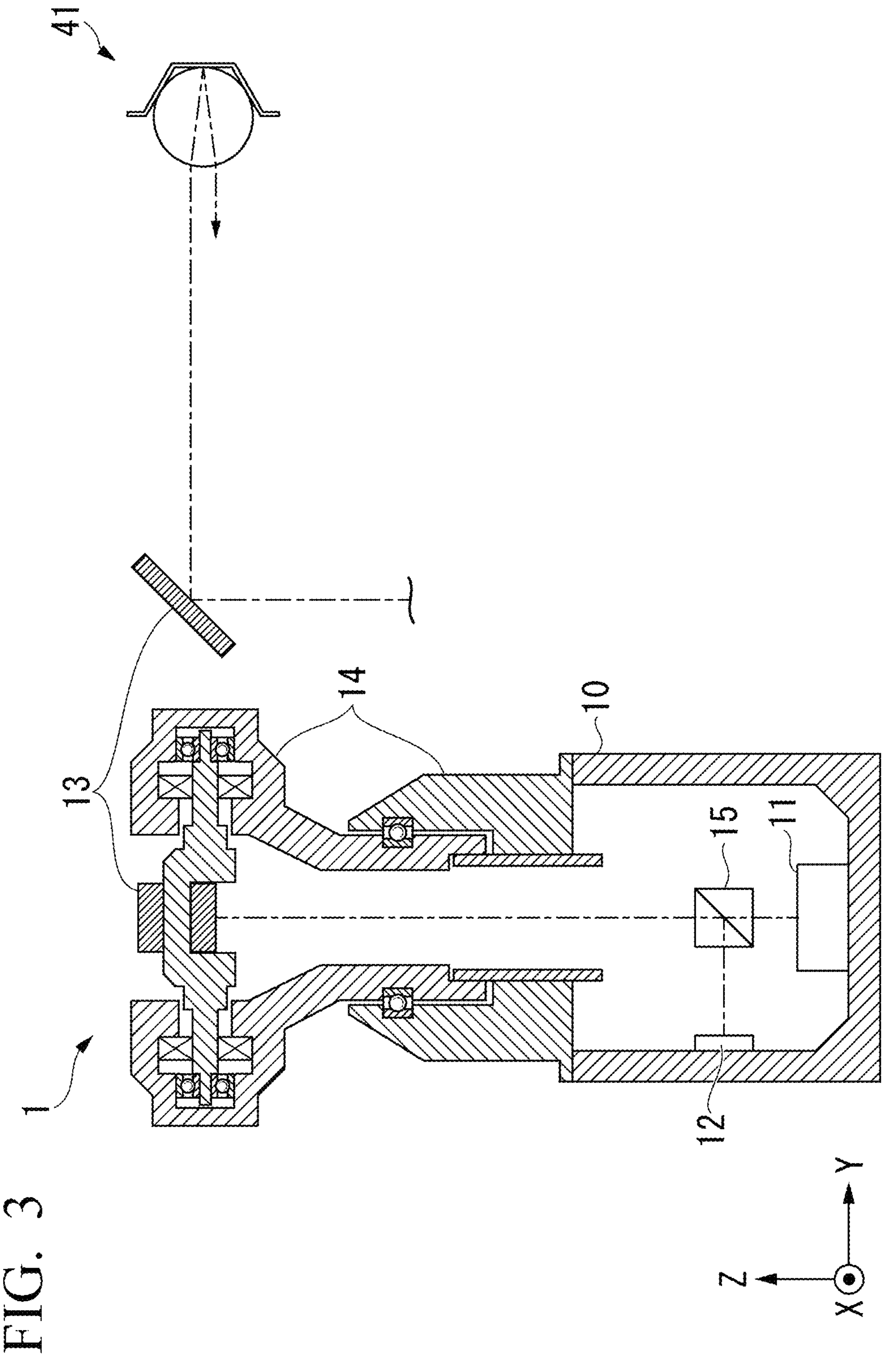
FIG. 3 is a diagram illustrating one example of the configuration of a measurement device according to the first embodiment.

Next, the configuration of the measurement device 1 will be described. FIG. 3 is a diagram illustrating one example of the configuration of the measurement device 1 according to this embodiment. The measurement device 1 includes a casing 10, an optical comb interferometer 11, a 4-division PSD 12, a beam steering mirror 13, a pointing mirror assembly (PMA) 14, and a half mirror 15.

The casing 10 is a member used for installing a main body of the measurement device 1 in an installation target. In this embodiment, the installation target is a self-running conveyance device such as a floor of a factory, an automatic guides vehicle (AGV), an autonomous mobile robot (AMR), or the like.

The casing 10, for example, fixes the measurement device 1 to an installation target by its own load. In addition, the casing 10 may include a mechanism that fixes the measurement device 1 to an installation target.

In addition, each component of the measurement device 1 may be included in the casing 10. Each component of the measurement device 1 is mounted in the casing 10. The beam steering mirror 13 and the PMA 14 are mounted on the outside of the casing 10. The optical comb interferometer 11, the 4-division PSD 12, and the PMA 14 are included on the inside of the casing 10. In addition, the casing 10 has a space for allowing measurement light and reflection light to propagate on the inside thereof.

The optical comb interferometer 11 measures a distance to a measurement target therefrom. The optical comb interferometer 11 includes an optical comb light source. The optical comb light source is a light source that can generate light including frequency components aligned at equal intervals on a frequency axis (hereinafter, it will be referred to as "optical frequency comb") as pulse light. In this case, the optical comb light source emits pulse light including the frequency components aligned at equal intervals on the frequency axis as measurement light. Here, since the reflective elements 41, 42, and 43 have the same configuration, in the following description, the reflective elements 41, 42, and 43 may be representatively described as the reflective element 41. The optical comb interferometer 11 emits an optical frequency comb to the reflective element 41, which is arranged as a measurement target, as measurement light. The optical comb interferometer 11 receives reflection light generated in accordance with reflection of a corresponding optical frequency comb on the reflective element 41.

In this embodiment, the optical comb interferometer 11 includes a single measurement light source (that is, an optical comb light source). In addition, the optical comb interferometer 11 may include a plurality of measurement light sources and, for example, may include a first measurement light source and a second measurement light source. The plurality of measurement light sources respectively emit a plurality of pieces of measurement light of which phases are synchronized with each other and which have interferences. For example, the plurality of measurement light sources may have mutually-different oscillation frequencies. For this reason, a plurality of pieces of measurement light emitted by the plurality of measurement light sources become a plurality of pieces of measurement light of which pulse frequencies (for example, the number of pieces of pulse light per unit time and a reciprocal of an emission period of pulse light) are different from each other. As one example, the first measurement light source may emit first measurement light of which a pulse frequency is 25 GHz, and the second measurement light source may emit second measurement light of which a pulse frequency is 25 GHz+$\alpha$ (for example, +100 kHz).

In measurement of a distance using the optical comb interferometer 11, a distance from the optical comb interferometer 11 to the reflective element 41 is measured on the basis of a generation position of an interference fringe between mutually-different pulses of an optical frequency comb. For example, the optical comb interferometer 11 can measure this distance with accuracy of an order of submicrometers.

The optical comb interferometer 11 includes an emission unit, a light receiving unit, and a signal processing unit. The emission unit includes an optical comb light source, a frequency control unit, and the like. The emission unit emits pulse light generated by this optical comb light source to a measurement target as measurement light. In addition, the emission unit causes a part of the pulse light generated by this optical comb light source to branch and emit, as reference light, the part to a reference face disposed inside the optical comb interferometer 11. The light receiving unit includes a photodetector. This photodetector detects interference light between reflection light and reference light emitted to the reference face. When a detection result acquired by the photodetector is input, the signal processing unit calculates a distance from the optical comb interferometer 11 to the reflective element 41 on the basis of a generation position of pulse light forming interference light between reflection light and the reference light.

Here, the principle of calculation of a distance from the optical comb interferometer 11 to the reflective element 41 using the optical comb interferometer 11 will be described in more detail.

The optical comb interferometer 11 includes two light sources including a first optical comb light source and a second optical comb light source as optical comb light sources. The optical comb interferometer 11 includes two photodetectors including a first photodetector and a second photodetector as photodetectors.

The first optical comb light source generates first measurement light that is pulse light having a first pulse frequency as measurement light. The second optical comb light source generates second measurement light that is pulse light having a second pulse frequency as measurement light. The first pulse frequency and the second pulse frequency are frequencies different from each other.

When the first measurement light is emitted from the first optical comb light source, it is reflected by an optical system of the inside of the first optical comb light source and then is incident in the first photodetector as first reflection light without being emitted to a measurement target (that is, the reflective element 41). On the other hand, the second measurement light is emitted from the second optical comb light source to a measurement target (that is, the reflective element 41) and is reflected by this measurement target, and then is incident in the second photodetector as second reflection light.

A part of the first measurement light branches, is emitted to a reference face of the inside of the optical comb interferometer 11 as first reference light, and then is incident in the second photodetector. On the other hand, a part of the second measurement light branches, is emitted to the reference face of the inside of the optical comb interferometer 11 as second reference light, and then is incident in the first photodetector.

Since the pulse frequency of the first measurement light and the pulse frequency of the second measurement light are different from each other, the pulse frequency of the first reflection light and the pulse frequency of the second reference light are different from each other. Thus, interference light between the first reflection light and the second reference light becomes interference light of which pulse light appears in synchronization with a timing at which pulse light configuring the first reflection light and pulse light configuring the second reference light are simultaneously incident in the first photodetector.

Similarly, the pulse frequency of the first reference light and the pulse frequency of the second reflection light are different from each other. Thus, interference light between the first reference light and the second reflection light becomes interference light of which pulse light appears in synchronization with a timing at which pulse light configuring the first reference light and pulse light configuring the second reflection light are simultaneously incident in the second photodetector.

Here, a position (a position on a time axis) of the pulse light forming interference light detected by the second photodetector is changed on the basis of a positional relation between the optical comb interferometer 11 and a measurement target. The reason for this is that the interference light detected by the second photodetector is interference light between the second reflection light directed toward the second photodetector through a measurement target and the first reference light directed toward the second photodetector without passing through the measurement target. On the other hand, the position (a position on a time axis) of pulse light forming interference light detected by the first photodetector does not change on the basis of the positional relation between the optical comb interferometer 11 and a measurement target.

For this reason, a time difference between pulse light forming interference light detected by the second photodetector and pulse light forming interference light detected by the first photodetector indirectly indicates a positional relation between the optical comb interferometer 11 and a measurement target (typically, a distance between the optical comb interferometer 11 and the measurement target). Thus, the optical comb interferometer 11 can calculate a distance from the optical comb interferometer 11 to the reflective element 41 on the basis of the time difference between the pulse light forming interference light detected by the second photodetector and the pulse light forming interference light detected by the first photodetector.

Here, measurement light emitted by the optical comb interferometer 11 is transmitted through the half mirror 15, then is reflected by the beam steering mirror 13, and is emitted to the reflective element 41. Here, an optical path of measurement light emitted to the reflective element 41 and reflection light reflected by the reflective element 41 are common in part inside the casing 10.

The half mirror 15 transmits measurement light emitted from the optical comb interferometer 11. In addition, the half mirror 15 causes a part of reflection light acquired in accordance with reflection of measurement light on the reflective element 41 to be transmitted through the optical comb interferometer 11 and reflects the remaining part to the 4-division PSD 12.

The 4-division PSD 12 measures the position of the reflective element 41 by detecting reflection light from the reflective element 41. This reflection light is reflection light acquired in accordance with reflection of the measurement light emitted by the optical comb interferometer 11 on the reflective element 41. This reflection light is partly reflected by the half mirror 15 and is incident in the 4-division PSD 12.

The 4-division PSD 12, for example, includes photodiodes and resistors. The photodiodes are arranged in an array form. In other words, the 4-division PSD 12 includes a photodiode array. The 4-division PSD 12 has four divisional detection faces. The 4-division PSD 12 measures the position of spotlight on the basis of the amount of the spotlight of reflection light detected in each of the four divisional detection faces.

The 4-division PSD 12 is used for estimating a position of each of three reflective elements (the reflective elements 41,

42, and 43) through scanning using measurement light L1 after roughly capturing a position of the marker 44 using a stereo camera 3.

In addition, the measurement device 1 may not include the stereo camera 3. In a case in which the measurement device 1 does not include the stereo camera 3, the 4-division PSD 12 may estimate positions of three reflective elements (the reflective elements 41, 42, and 43) through scanning using measurement light L1 without using a result in which the position of the marker 44 is roughly captured using the stereo camera 3.

In addition, the measurement device 1 may include another position detector in place of the 4-division PSD 12. The other position detector, for example, is a line sensor, a two-dimensional sensor (also referred to as an area sensor), a distance measuring device of a phase detection type, or the like.

The beam steering mirror 13 reflects measurement light emitted from the optical comb interferometer 11 in a direction toward the reflective element 41. In addition, the beam steering mirror 13 reflects reflection light acquired by reflecting measurement light from the reflective element 41 in a direction toward the optical comb interferometer 11. The beam steering mirror 13 is one example of a movable mirror.

The PMA 14 moves (changes) the direction of the beam steering mirror 13. The PMA 14, as one example, includes a gimbal unit and a rotary encoder (not illustrated). The orientation of the beam steering mirror 13 is changed in accordance with a change in the rotation angle of the gimbal unit by driving the gimbal unit. The gimbal unit can rotate the beam steering mirror 13 such that the longitude direction and the latitude direction can be changed. The rotary encoder measures the rotation angle of the gimbal unit.

Here, the configuration of the three reflective elements (the reflective elements 41, 42, and 43) will be described with reference to FIGS. 4 to 6 using the reflective element 41 as a representative.

Figure 4:
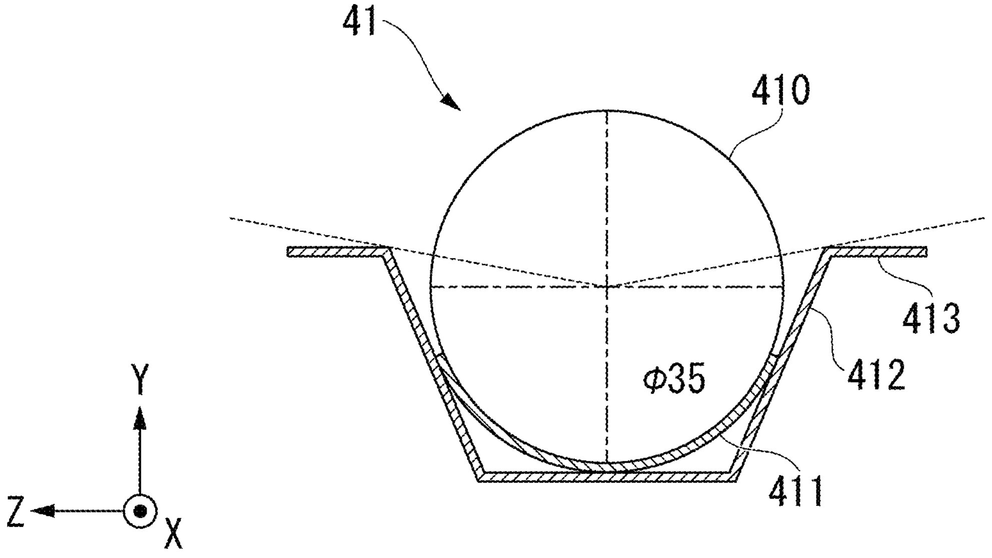
FIG. 4 is a diagram illustrating one example of the configuration of a cross-section of a reflective element according to the first embodiment.
Figure 5:
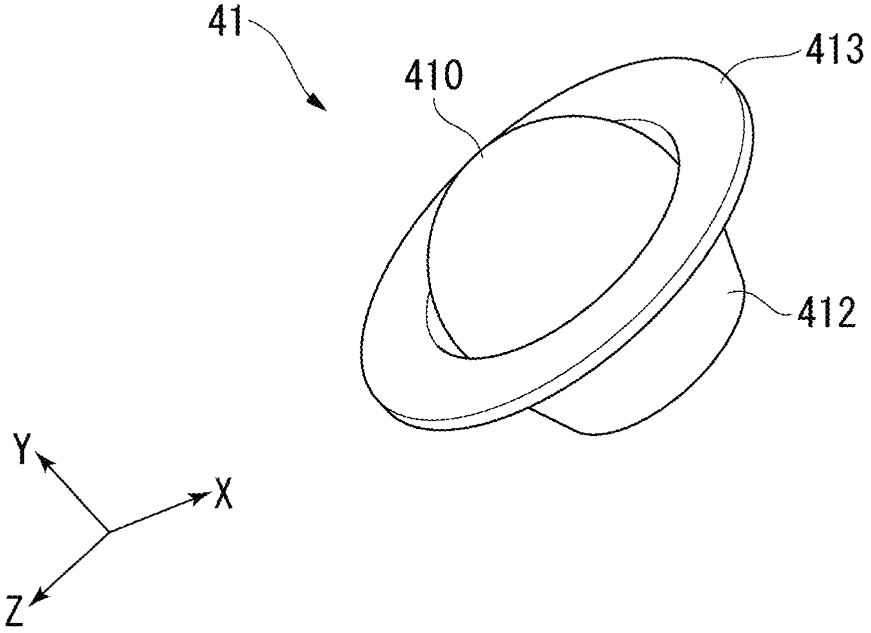
FIG. 5 is a diagram illustrating one example of an external appearance of a reflective element according to the first embodiment.

FIG. 4 is a diagram illustrating one example of the configuration of a cross-section of the reflective element 41 according to this embodiment. FIG. 5 is a diagram illustrating one example of an external appearance of the reflective element 41 according to this embodiment. The reflective element 41 includes a lens 410, a mirror face 411, a housing member 412, and a marker installation face 413.

The lens 410 is a lens having an approximately spherical shape. In this embodiment, as one example, the diameter of the lens 410 is 35 mm. The lens 410 has a predetermined refractive index for a wavelength of measurement light L1.

The lens 410 has the mirror face 411 on the surface of the sphere. Mirror deposition is performed for the mirror face 411 to be formed to cover a part of the lens 410 of the spherical shape. The mirror face 411 has reflectance of a predetermined value or more for the wavelength of the measurement light L1.

The housing member 412 houses the lens 410. The lens 410 is housed in the housing member 412 and is bonded and fixed to the housing member 412 such that a part of the lens 410 is exposed. The part approximately coincides with a part of the lens 410 of the spherical shape in which the mirror face 411 is not formed. In order to sufficiently widen a range in which the reflective element 41 can reflect incidence light, it is preferable that at least a half sphere of the lens 410 be exposed. In addition, since the housing member 412 fixes the lens 410, it may be also referred to as a holding part.

The housing member 412 includes the marker installation face 413. An LED and a reflection seal may be installed on the marker installation face 413.

Figure 6:
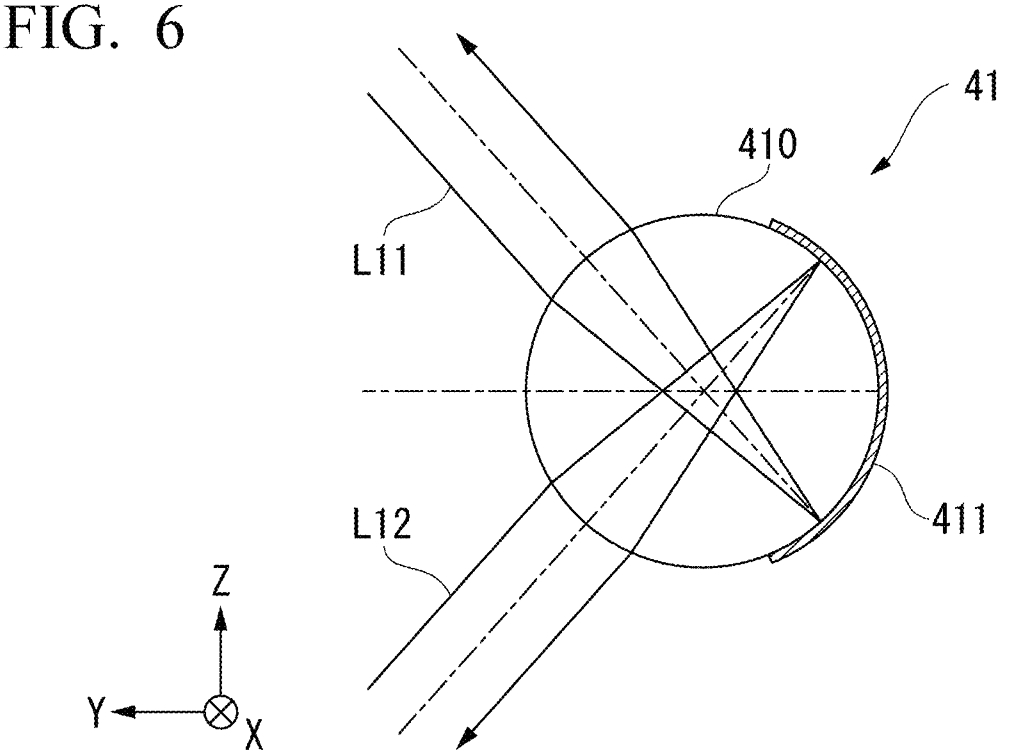
FIG. 6 is a diagram illustrating one example of an appearance in which the reflective element according to the first embodiment reflects measurement light.

FIG. 6 is a diagram illustrating one example of an appearance in which the reflective element 41 according to this embodiment reflects measurement light. In FIG. 6, as an example of measurement light L1 that is emitted to the reflective element 41 by the measurement device 1, measurement light L11 and measurement light L12 are illustrated. Each of the measurement light L11 and the measurement light L12 is incident in the lens 410 and then is reflected by the mirror face 411 in an incidence direction. The reflective element 41 is an optical element that reflects a beam in the incidence direction regardless of a position or a direction from which the beam is incident thereto. In other words, the reflective element 41 has a retroreflective function.

Figure 7:
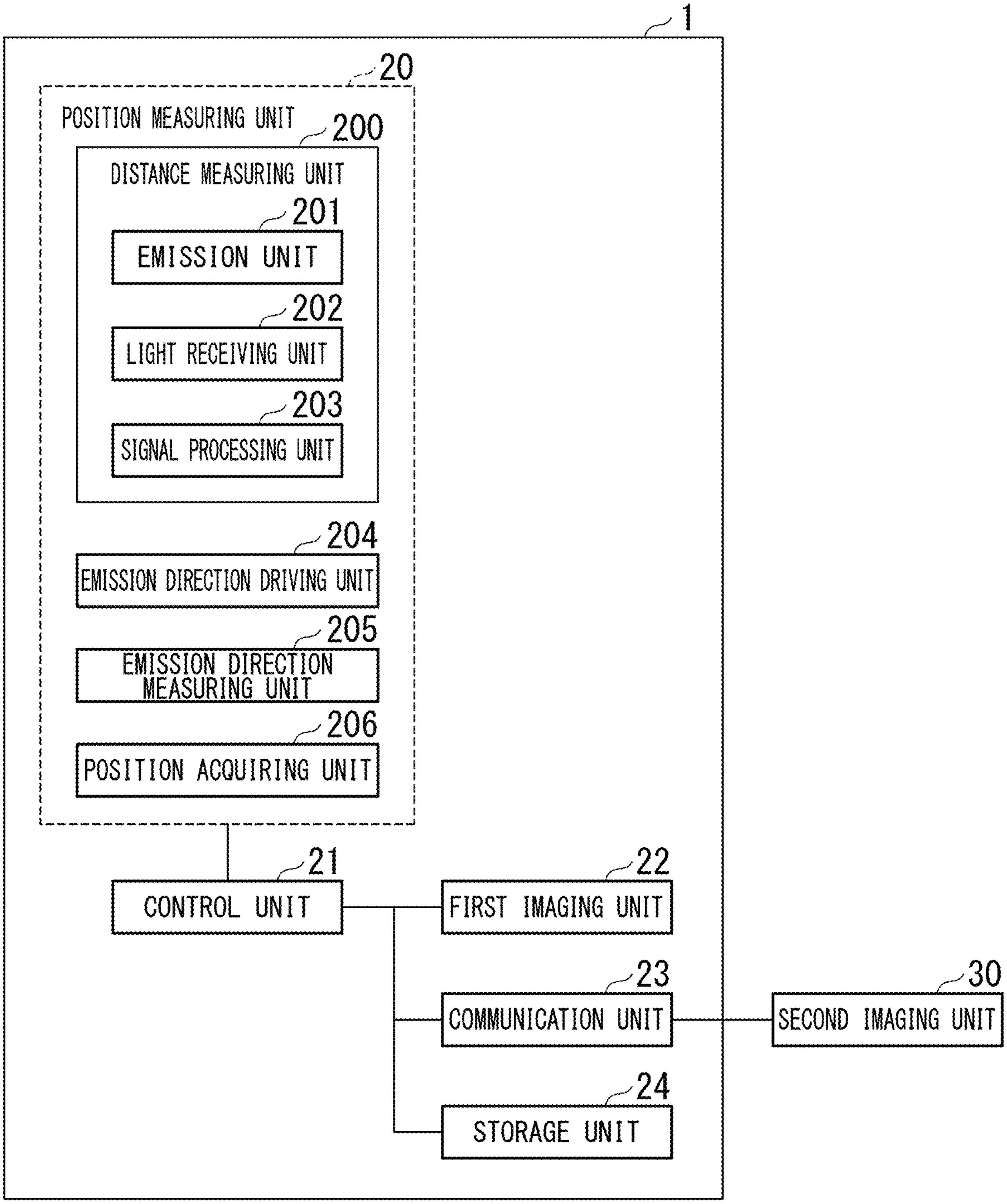
FIG. 7 is a diagram illustrating one example of the functional configuration of a measurement device according to the first embodiment.

FIG. 7 is a diagram illustrating one example of the functional configuration of the measurement device 1 according to this embodiment. The measurement device 1 includes a position measuring unit 20, a control unit 21, a first imaging unit 22, a communication unit 23, and a storage unit 24.

The position measuring unit 20 includes a distance measuring unit 200, an emission direction driving unit 204, an emission direction measuring unit 205, and a position acquiring unit 206.

The distance measuring unit 200 emits measurement light to the reflective element 41 and receives reflection light, thereby measuring a distance to the reflective element. The distance measuring unit 200 includes an emission unit 201, a light receiving unit 202, and a signal processing unit 203. The emission unit 201 emits measurement light to each of at least three reflective elements attached to a movable unit of a measurement target. In other words, the emission unit 201 can emit measurement light L1 to each of at least three reflective elements (the reflective elements 41, 42, and 43) attached to a robot T1. The light receiving unit 202 receives reflection light. Here, the light receiving unit 202 can receive reflection light reflected by each of the three reflective elements (the reflective elements 41, 42, and 43).

The signal processing unit 203 acquires distance information up to the reflective element 41 by processing a signal from the light receiving unit 202. The distance measuring unit 200 includes an optical comb interferometer 11.

The emission unit 201 includes an optical comb light source included in the optical comb interferometer 11. The emission unit 201 can emit a light comb as measurement light L1. The emission unit 201 emits the measurement light L1 to each of the three reflective elements (the reflective elements 41, 42, and 43) through a reflection face of the beam steering mirror 13.

The light receiving unit 202 includes a light receiving unit that is included in the optical comb interferometer 11. The light receiving unit 202 receives reflection light from each of the three reflective elements (the reflective elements 41, 42, and 43) through the reflection face of the beam steering mirror 13.

The signal processing unit 203 includes a signal processing unit that is included in the optical comb interferometer 11.

The emission direction driving unit 204 changes an emission direction of measurement light. The changing of the emission direction is also referred to as moving of the emission direction. The emission direction driving unit 204 includes the gimbal unit included in the PMA 15.

The emission direction measuring unit 205 measures an emission direction of measurement light. The emission direction measuring unit 205 includes the rotary encoder that is included in the PMA 15 and measures the angle of the gimbal unit. The emission direction measuring unit 205 outputs a measurement result of the emission direction to the position acquiring unit 206 of the distance measuring unit 200 as direction information.

The position acquiring unit 206 acquires a position (position information) inside a three-dimensional space in each of the three reflective elements (the reflective elements 41, 42, and 43) from a distance (distance information) to the reflective element 41 that is measured by the distance measuring unit 200 and an emission direction (direction information) of measurement light that is measured by the emission direction measuring unit 205. In addition, the position acquiring unit 206 calculates direction information in each of the three reflective elements on the basis of the position information in each of the three reflective elements.

The position information includes position information relating to a first axis of a measurement target (the robot T1 in this embodiment), position information relating to a second axis intersecting with the first axis, and position information relating to a third axis intersecting with the first axis and the second axis. The first axis, for example, is an x axis in an orthogonal coordinate system set in a space in which a measurement target is disposed. The second axis, for example, is a y axis in the orthogonal coordinate system. The third axis, for example, is a z axis in the orthogonal coordinate system. The position information relating to the first axis, for example, represents coordinates of the x axis. The position information relating to the second axis, for example, represents coordinates of the y axis. The position information relating to the third axis, for example, represents coordinates of the z axis.

The direction information includes information relating to a position in a rotation direction around the first axis (for example, the x axis) of a measurement target, information relating to a position in a rotation direction around the second axis (for example, the y axis), and information relating to a position in a rotation direction around the third axis (for example, the z axis). In other words, the direction information is information that represents a position in a rotation direction around a predetermined axis. In other words, the direction information is information that represents the posture or orientation of a measurement target.

The position acquiring unit 206 acquires position information relating to the first axis (the x axis) of the robot T1, position information relating to the second axis (the y axis) intersecting with the first axis (the x axis), and position information relating to the third axis (the z axis) intersecting with the first axis (the x axis) and the second axis (the y axis) and the information relating to a position in the rotation direction around the first axis (the x axis), the information relating to a position in the rotation direction around the second axis (the y axis), and the information relating to a position in the rotation direction around the third axis (the z axis) on the basis of light reception results acquired by the light receiving unit 202. In addition, details of acquisition of the position information and the direction information will be described below.

The control unit 21 performs control of other devices and components included in the measurement device 1. The control unit 21, for example, includes a central processing unit (CPU), a graphics processing unit (GPU), a field-programmable gate array (FPGA), and the like and performs various arithmetic operations and transmission/reception of information. The control unit 21 reads a program from a ROM and performs various kinds of control in accordance with the read program.

In addition, the control unit 21 and devices and components included in the measurement device 1, for example, are connected to each other using signal lines. Furthermore, the control unit 21 and each of the devices and the components included in the measurement device 1 may communicate with each other through near field communication using electromagnetic waves such as light, electric waves, and the like. In addition, the control unit 21 performs various arithmetic operations.

The first imaging unit 22 images at least some of the three reflective elements (the reflective elements 41, 42, and 43). The first imaging unit 22 includes the 4-division PSD 12.

The communication unit 23 communicates with external devices. Various devices, for example, are a control system controlling the robot T1 in which the reflective element 41 is installed and a second imaging unit 30.

The communication unit 23 includes a transmission unit and a reception unit. The transmission unit transmits position information and direction information of the reflective element 41 acquired by the position acquiring unit 206 included in the position measuring unit 20 to the control system. The communication unit 23 includes a communication interface (IF) used for communication through a wireless network.

As communication using the communication unit 23, for example, a 5th-generation mobile communication system or a mobile communication system using light of which a wavelength is shorter than a millimeter wave may be used. In the 5th mobile communication system, a frequency band of 450 Mhz to 6000 Mhz and a frequency band of 24250 Mhz to 52600 Mhz are used as frequency bands.

The second imaging unit 30 images the marker 44. The second imaging unit 30 images the marker 44 using reflection light acquired by causing natural light or artificial light of an electric bulb, a fluorescent lamp, a mercury lamp, an LED, a strobe, or the like to be reflected on the reflective element 41. As described above, the marker 44 is disposed at a predetermined position with respect to the three reflective elements (the reflective elements 41, 42, and 43). The second imaging unit 30 includes a stereo camera 3.

In addition, in this embodiment, although one example of a case in which the second imaging unit 30 is included as a body separated from the measurement device 1 is described, the configuration is not limited thereto. The second imaging unit 30 may be included with being integrated with the measurement device 1.

The storage unit 24 stores various kinds of information. In the storage unit 24, for example, reflective element arrangement information is stored in advance. The reflective element arrangement information is information that represents arrangement of each of the three reflective elements (the reflective elements 41, 42, and 43). This arrangement is determined in accordance with positions at which the three reflective elements (the reflective elements 41, 42, and 43) are disposed with respect to the target member 4.

The measurement device 1 emits measurement light L1 to each of the three reflective elements (the reflective elements 41, 42, and 43) attached to the robot T1. The measurement device 1 receives reflection light acquired by reflecting the measurement light L1 using the three reflective elements (the reflective elements 41, 42, and 43). The measurement device 1 measures a position of the robot T1 and positions in the rotation directions on the basis of light reception results for the reflection light.

By imaging the marker 44, the stereo camera 3 estimates the position of the marker 44. The stereo camera 3 estimates the position of the marker 44 with low accuracy on the basis of a parallax between one pair of cameras. For example, the low accuracy is accuracy of about 100 mm.

Figure 8:
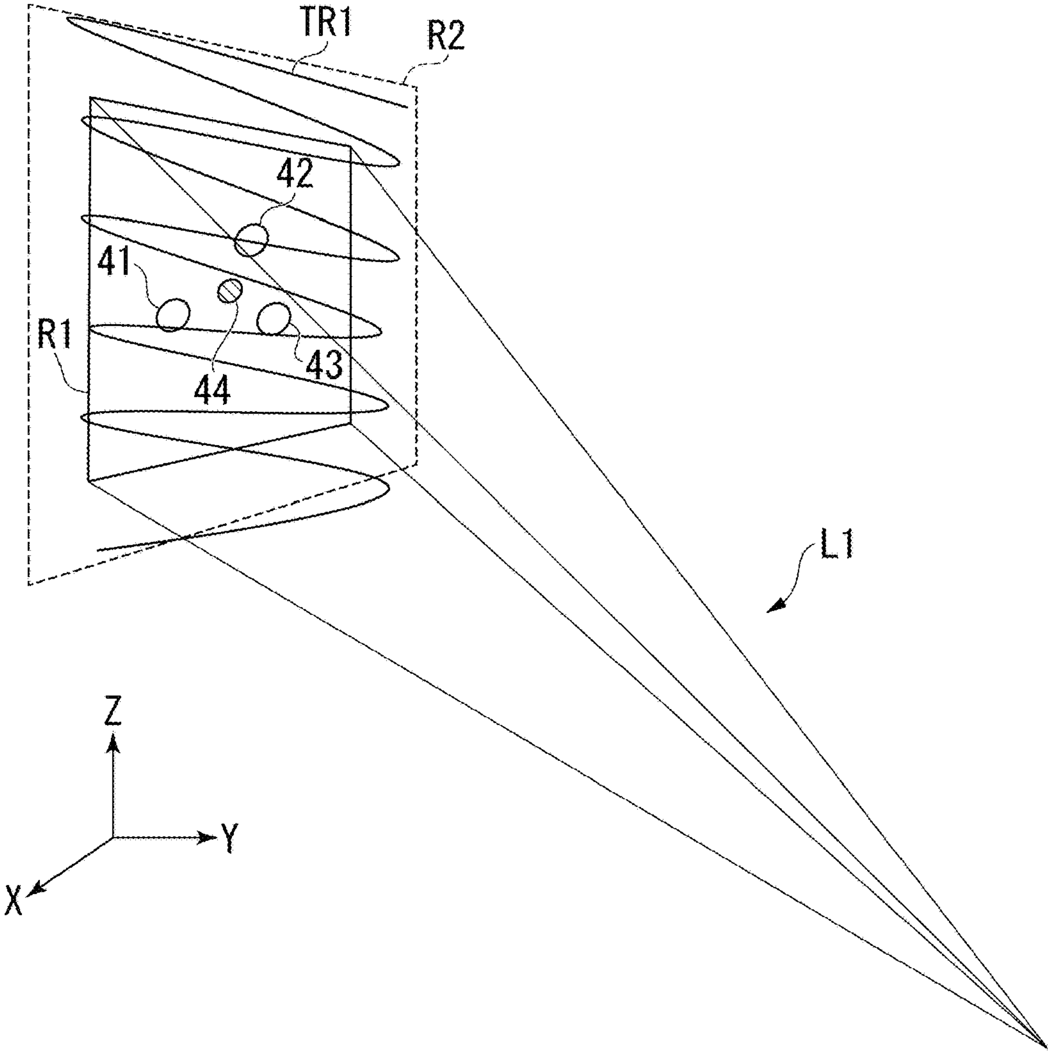
FIG. 8 is a diagram illustrating one example of an appearance of scanning using measurement light according to the first embodiment.

The measurement device 1 scans a predetermined range based on the position of the marker 44, which has been estimated by the stereo camera 3, using the measurement light L1. FIG. 8 illustrates one example of an appearance of scanning using the measurement light L1. An estimation range R1 is a predetermined range based on the position of the marker 44 that has been estimated by the stereo camera 3. The estimation range R1 includes the position of the marker 44 that has been estimated by the stereo camera 3. For example, the estimation range R1 is a rectangular range of which one side is about 100 mm.

The measurement device 1 sets a predetermined range including the estimation range R1 as a scanning range R2. The scanning range R2 is a range in which scanning is performed using measurement light L1. The measurement device 1 performs scanning along an orbit TR1. For example, the orbit TR1 is an orbit of a wavy line shape or a spiral shape. As described above, since the three reflective elements (the reflective elements 41, 42, and 43) are disposed near the marker 44, the positions of the three reflective elements (the reflective elements 41, 42, and 43) are included in the scanning range R2.

The measurement device 1 estimates the positions of the three reflective elements (the reflective elements 41, 42, and 43) to which the measurement light L1 has been emitted using a position sensitive detector (PSD). This PSD detects reflection light acquired in accordance with reflection of the measurement light L1 using each of the three reflective elements (the reflective elements 41, 42, and 43).

The measurement device 1 scans measurement light L1 along a predetermined orbit along which three reflective elements (the reflective elements 41, 42, and 43) can be passed through. This orbit is calculated on the basis of an estimation result of the positions of the three reflective elements acquired using the PSD. The measurement device 1 measures each of the positions of the three reflective elements (the reflective elements 41, 42, and 43) on the basis of a reception result of reflection light acquired in accordance with reflection of the measurement light L1 according to scanning using each of the three reflective elements (the reflective elements 41, 42, and 43). The measurement device 1 measures a position of the robot T1 to which the target member 4 is attached and positions in the rotation directions on the basis of the measurement results of the positions of the three reflective elements (the reflective elements 41, 42, and 43).

In this embodiment, the position of the robot T1 is a position of the target member 4 that is attached to the movable unit of the robot T1. Position information representing this position is information that represents the position of the target member 4 with respect to a reference position. The reference position is a predetermined position inside a space in which the target member 4 is disposed.

The position information representing the position of the target member 4 is represented using coordinates in a coordinate system (also referred to as a reference coordinate system) inside a space in which the target member 4 is disposed. For example, the position information is represented using rectangular coordinates (X, Y, Z). A set of coordinate X, coordinate Y, and coordinate Z represents a position inside rectangular coordinates (X, Y, Z). In addition, the coordinate X, the coordinate Y, and the coordinate Z may be respectively referred to as the distance in the X direction, the distance in the Y direction, and the distance in the Z direction.

A position in a rotation direction of the robot T1 is a position in a rotation direction of the movable unit to which the target member 4 is attached. Information relating to the position in a rotation direction representing the position in this rotation direction (it will be referred to as direction information) is represented using the position in a rotation direction around each coordinate axis in three coordinate axes of a reference coordinate system. The position in the rotation direction around each coordinate axis is represented using an angle representing the rotation. In a case in which the position information described above is represented using rectangular coordinates, the direction information is represented using a position in a rotation direction around the coordinate axis of this rectangular coordinates. In other words, the direction information is represented using a position in rotation around the X axis, a position in rotation around the Y axis, and a position in rotation around the Z axis.

Figure 9:
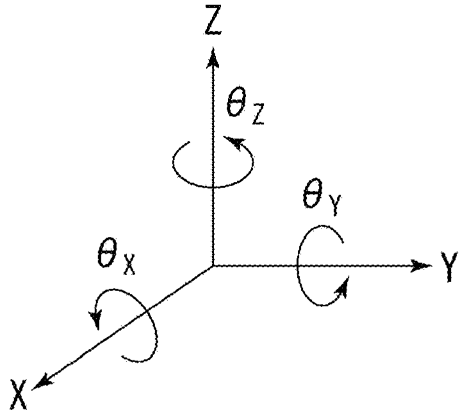
FIG. 9 is a diagram illustrating one example of a position in a rotation direction around a coordinate axis of a case in which position information according to the first embodiment is represented using rectangular coordinates.

FIG. 9 illustrates one example of a position in a rotation direction around a coordinate axis of a case in which position information is represented using rectangular coordinates. In FIG. 9, a position in rotation around the X axis is represented using a rotation angle θX, a position in rotation around the Y axis is represented using a rotation angle θY, and a position in rotation around the Z axis is represented using a rotation angle θZ.

In addition, a position in a rotation direction around an axis may be also referred to as a direction, a posture, or the like.

The measurement device 1 transmits the position information and the direction information that have been measured to a control system (not illustrated) of the robot T1. A reference position and a coordinate system are shared in advance between the measurement device 1 and the control system. This control system can acquire the position of the robot T1 on the basis of the position information received from the measurement device 1 and thus can correct the robot T1 with high accuracy.

In addition, in this embodiment, although one example of a case in which the target member 4 including three reflective elements (the reflective elements 41, 42, and 43) is attached to the robot T1, that is, a case in which three reflective elements (the reflective elements 41, 42, and 43) are attached to the robot T1 is described, the configuration is not limited thereto. At least three or more reflective elements may be attached to the robot T1. For example, four or more reflective elements may be attached to the robot T1.

Figure 10:
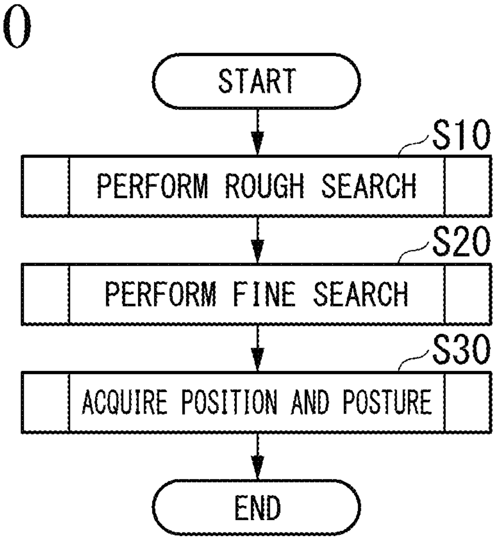
FIG. 10 is a diagram illustrating one example of a measurement process according to the first embodiment.

Next, a measurement process that is a process of acquiring position information and direction information using the measurement device 1 will be described with reference to FIG. 10. FIG. 10 is a diagram illustrating one example of a measurement process according this embodiment. The measurement process is performed by the control unit 21. In addition, in this embodiment, the robot T1 is assumed not to move while the measurement device 1 performs the measurement process. In other words, while the measurement device 1 performs the measurement process, the position and the posture of the robot T1 are not changed.

Figure 11:
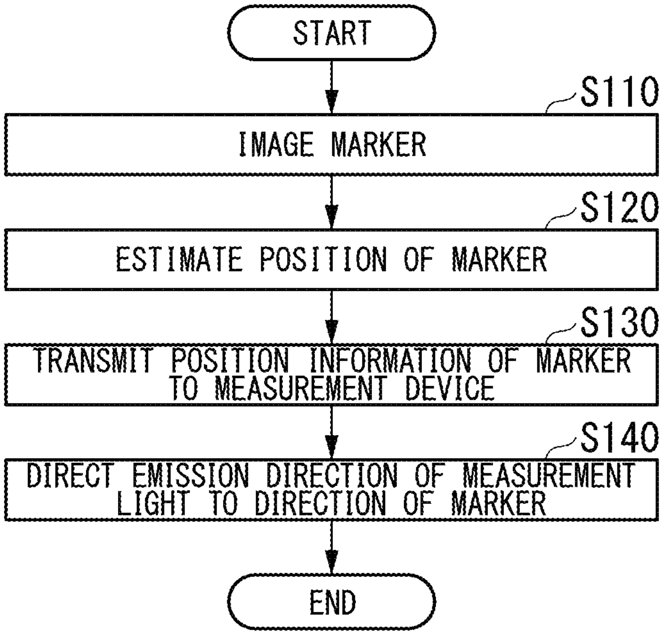
FIG. 11 is a diagram illustrating one example of a process of a rough search according to the first embodiment.

The control unit 21 performs a rough search (Step S10). Here, details of the process of the rough search will be described with reference to FIG. 11. FIG. 11 is a diagram illustrating one example of the process of the rough search according to this embodiment.

The control unit 21 captures an image of the marker 44 using the second imaging unit 30 (Step S110). The control unit 21 controls the second imaging unit 30 through the communication unit 23. The second imaging unit 30 is controlled by the control unit 21 to capture an image of the marker 44 using the stereo camera 3.

The stereo camera 3 captures an image of a visual field of a direction toward the stereo camera 3 using each of one pair of cameras. Here, the stereo camera 3 is assumed to be directed in advance in a direction in which the target member 4 is disposed.

The stereo camera 3 generates a high-contrast image from images captured using one pair of cameras through image processing. The high-contrast image is an image of which contrast is higher than that of an image before the image processing. The stereo camera 3 determines an area corresponding to the image of the marker 44 from the entire area of the high-contrast image (also referred to as segmentation) on the basis of artificial intelligence (AI) as one example. Various kinds of machine learning may be used as the AI. For each of the images captured by one pair of cameras, the stereo camera 3 determines an area corresponding to the image of the marker 44.

The stereo camera 3 determines a position of the marker 44 inside the image on the basis of the determined area. The stereo camera 3 determines the position of the marker 44 inside the image as two-dimensional coordinates inside the image. For each of the images captured by the one pair of cameras, the stereo camera 3 determines the position of the marker 44 inside the image. The stereo camera 3 estimates the position of the marker 44 on the basis of the position of the marker 44 inside an image in each of images captured by one pair of cameras and a parallax between the one pair of cameras (Step S120). As described above, the position of the marker 44 is a position inside a space in which the target member 4 is disposed.

The stereo camera 3 transmits marker position information that is position information representing the estimated position of the marker 44 to the control unit 21 through the communication unit 23 of the measurement device 1 (Step S130). The control unit 21 acquires marker position information from the stereo camera 3 through the communication unit 23. The control unit 21 controls the emission direction driving unit 204 such that an emission direction of measurement light is directed in a direction in which the marker 44 is positioned on the basis of the acquired marker position information (Step S140). Here, the control unit 21 controls the emission direction driving unit 204 on the basis of the marker position information, thereby directing the emission direction of measurement light to be in a direction in which the marker 44 is positioned.

In addition, in Step S120, in a case in which a plurality of markers 44 are disposed in the visual field of a direction in which the stereo camera 3 is directed, the stereo camera 3 may estimate the position of the marker 44 in each of the plurality of markers 44. In that case, the stereo camera 3 may transmit marker position information to the measurement device 1 for each of the markers 44 of which the positions have been estimated.

In addition, in Step S120, although one example of a case in which AI is used for judging the image of the marker 44 has been described, the configuration is not limited thereto. In order to determine the image of the marker 44, template matching may be used.

In addition, although one example of a case in which the position of the marker 44 is estimated by the stereo camera 3 and is transmitted to the measurement device 1 as marker position information has been described, the configuration is not limited thereto. At least one of the process of judging an area corresponding to the image of the marker 44 and the process of estimating the position of the marker 44 on the basis of a parallax between one pair of cameras may be performed by the control unit 21.

In addition, in a case in which the stereo camera 3 is included in the measurement device 1, the process of judging an area corresponding to the image of the marker 44 and the process of estimating the position of the marker 44 on the basis of a parallax between one pair of cameras are performed by the control unit 21.

The description of the position measuring process will be continued by referring back to FIG. 10.

Figure 12:
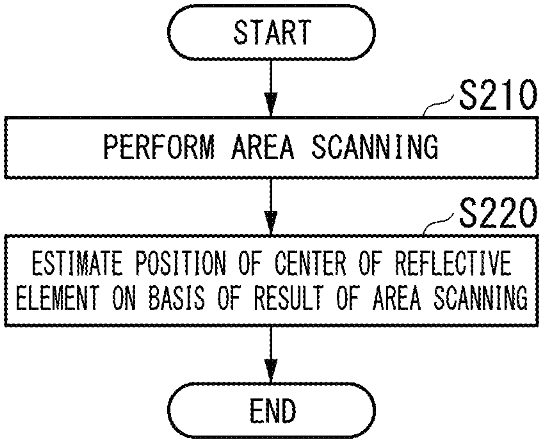
FIG. 12 is a diagram illustrating one example of a process of a fine search according to the first embodiment.

The control unit 21 performs the process of a fine search (Step S20). The fine search is a search of which the accuracy of position measurement is higher than that of the rough search described above. In addition, the fine search may be a search of which a search range is narrower than that of the rough search. Here, details of the process of the fine search will be described with reference to FIG. 12. FIG. 12 is a diagram illustrating one example of the process of the fine search according to this embodiment.

The control unit 21 performs area scanning (Step S210). Here, the control unit 21, as illustrated in FIG. 8, scans a predetermined range based on the position of the marker 44 that has been estimated by the stereo camera 3 using measurement light L1. The control unit 21 performs area scanning by controlling the emission direction driving unit 204 and the first imaging unit 22. The control unit 21 estimates the position of the center of the reflective element on the basis of a result of the area scanning (Step S220).

Here, details of the area scanning will be described with reference to FIGS. 13 to 22.

Figure 13:
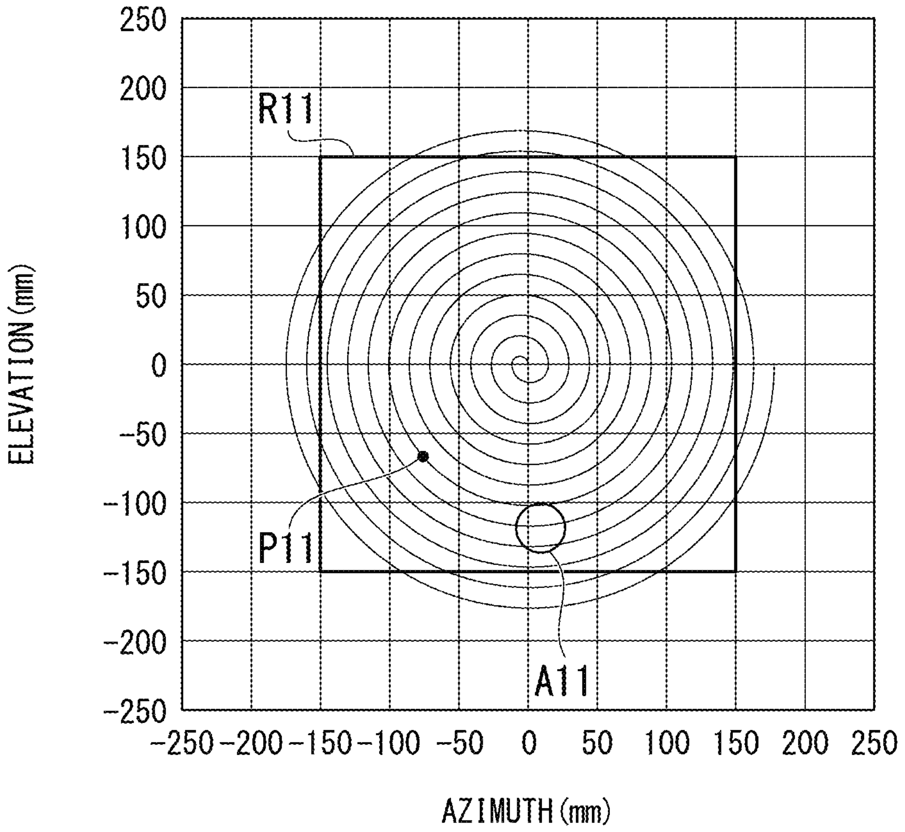
FIG. 13 is a diagram illustrating one example of an orbit of measurement light in area scanning according to the first embodiment.

FIG. 13 is a diagram illustrating one example of an orbit of measurement light L1 in area scanning according to this embodiment. In FIG. 13, the orbit of the measurement light L1 is an orbit having a spiral shape. In FIG. 13, a predetermined range for which area scanning is performed is illustrated using an azimuth and an elevation. The azimuth represents a position (an azimuth angle) in a horizontal direction. The elevation represents an azimuth (an elevation angle) in a vertical direction. An estimation range R11 represents a predetermined range based on the position of the marker 44 that has been estimated by the stereo camera 3. In a case in which the distance between the measurement device 1 and the target member 4 is 10 m, the estimation range R11 is a rectangular range of which one side is 300 mm in the visual field of the 4-division PSD 12.

The control unit 21 scans a predetermined range including the estimation range R11 using measurement light L1. The control unit 21 scans this predetermined range along an orbit having a spiral shape using the measurement light L1. The scanning may be performed from the center of the spiral to the outer side, or the scanning may be performed from the outer side to the center of the spiral. A point P11 represents a current emission position of the measurement light L1.

In FIG. 13, one reflective element A11 is positioned inside an estimation range R11 as one example. Here, for description, a case in which only one of three reflective elements (reflective elements 41, 42, and 43) is attached to a target member 4 will be considered. The reflective element A11 is this one reflective element.

Figure 14:
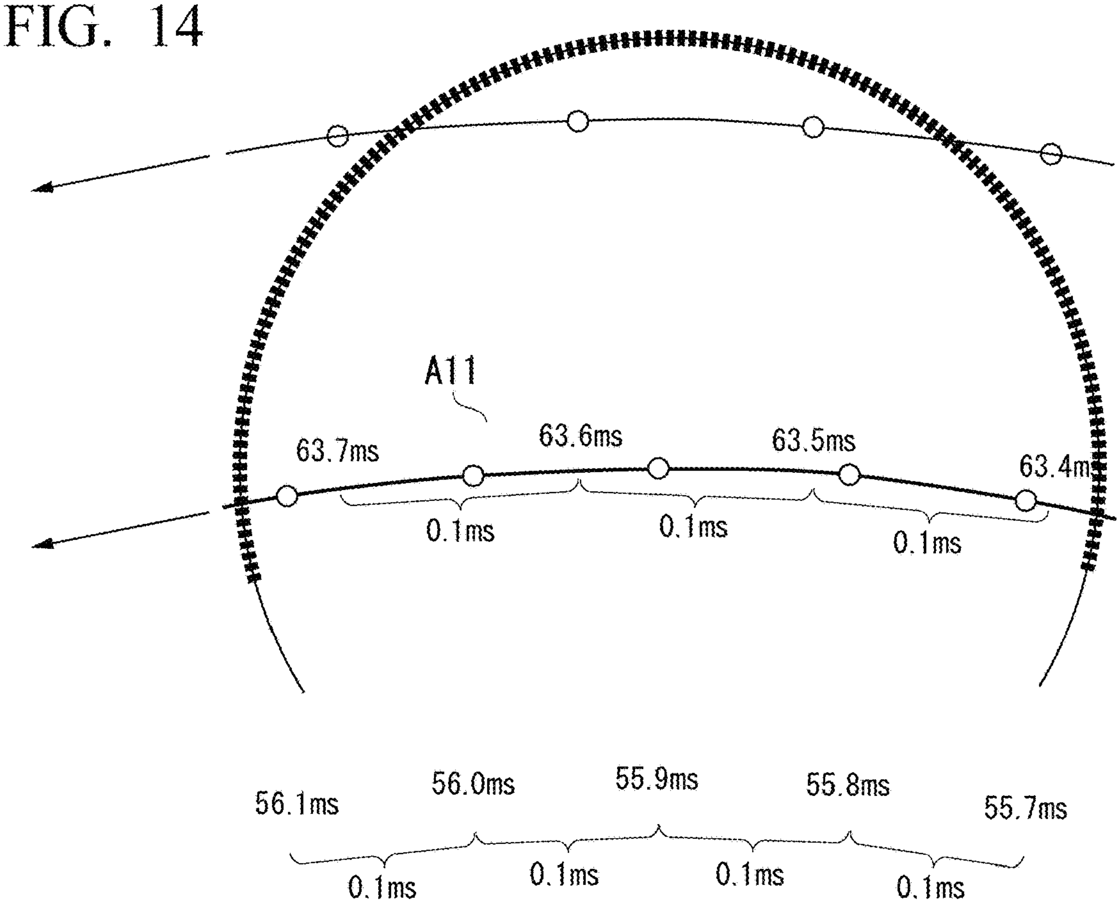
FIG. 14 illustrates one example of an appearance in which measurement light is emitted to a reflective element according to the first embodiment while being scanned along an orbit of a spiral shape.

A 4-division PSD 12 detects reflection light acquired in accordance with reflection of the measurement light L1 on the reflective element A11. FIG. 14 illustrates one example of an appearance in which the measurement light L1 is emitted to the reflective element A11 while scanning along an orbit having a spiral shape. As illustrated in FIG. 14, the measurement light L1 is intermittently emitted for every 0.1 ms as one example. In other words, the measurement light L1 is emitted at 10 kHz.

In addition, in area scanning, the measurement light L1 is emitted for enabling the 4-division PSD 12 to detect reflection light from a reflective element, and measurement of a distance using the optical comb interferometer 11 is not performed.

The 4-division PSD 12 detects reflection light acquired in accordance with reflection of measurement light L1, and an optical path of the measurement light L1 and an optical path of the reflection light coincide with each other. For this reason, the emission direction of the measurement light L1 and the direction of the visual field of the 4-division PSD 12 coincide with each other. In other words, the direction of the visual field of the 4-division PSD 12 is changed in accordance with a change of the emission direction of the measurement light L1 according to area scanning.

Figure 15:
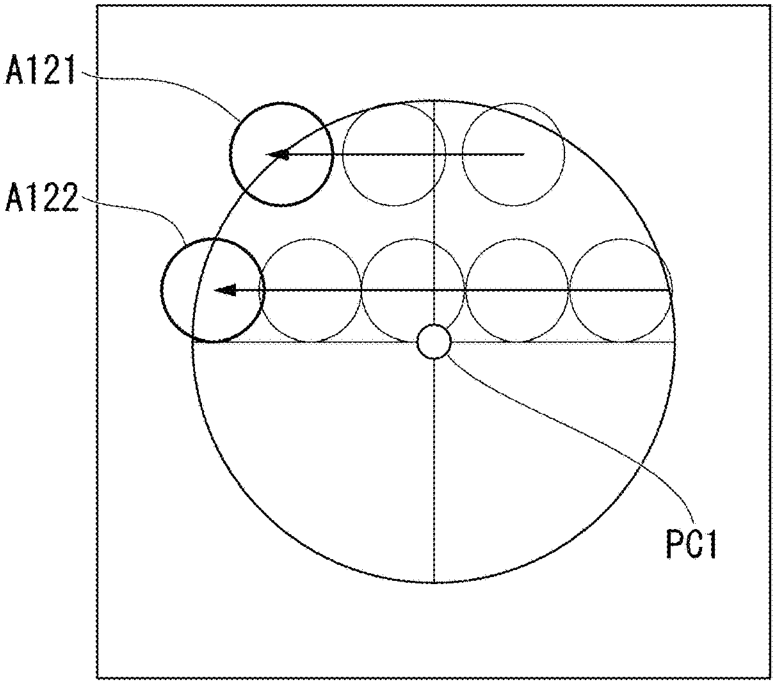
FIG. 15 is a diagram illustrating one example of an appearance in which an image of a reflective element moves inside a visual field of a 4-division PSD in the process of scanning according to the first embodiment.

FIG. 15 is a diagram illustrating one example of an appearance in which an image of a reflective element moves inside a visual field of the 4-division PSD 12 in the process of scanning according to this embodiment. Each of images A121 and A122 illustrates an appearance in which an image of the reflective element A11 detected by the 4-division PSD 12 moves inside a visual field of the 4-division PSD 12 in the case of scanning along an orbit having a spiral shape.

In order to estimate the position of the reflective element A11, it is necessary to determine the direction of the visual field of the 4-division PSD 12 of a case in which the image of the reflective element A11 is detected at the center PC1 of the visual field of the 4-division PSD 12. As described above, the direction of the visual field of the 4-division PSD 12 is the emission direction of the measurement light L1. The emission direction of the measurement light L1 is measured by the emission direction measuring unit 205 as a rotation angle of the gimbal unit.

Figure 16:
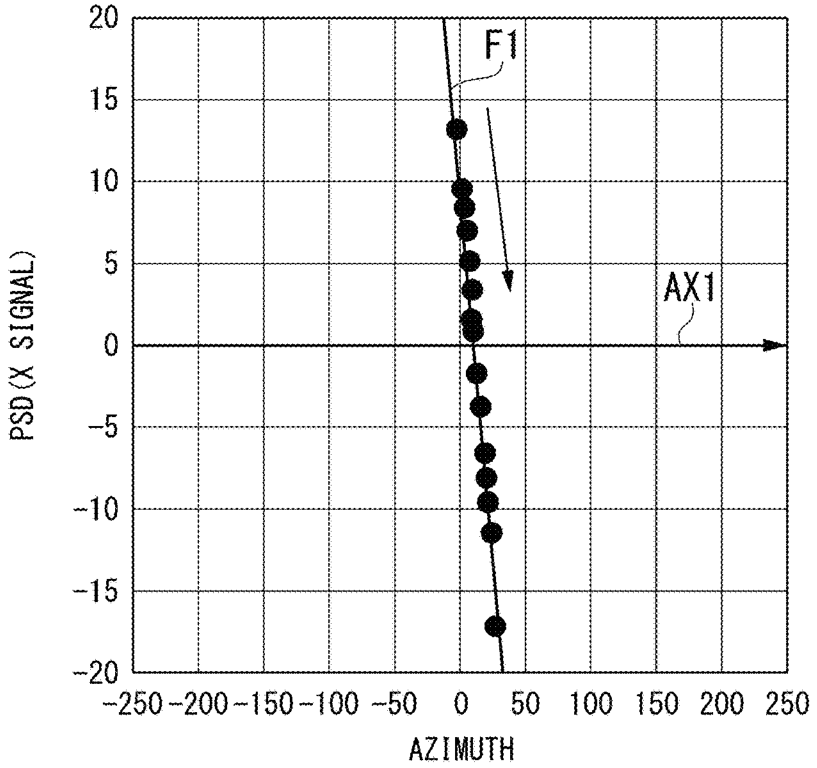
FIG. 16 is a diagram illustrating one example of a position of a reflective element inside a visual field of a 4-division PSD in a horizontal direction with respect to an emission direction of an azimuth direction of measurement light according to the first embodiment.
Figure 17:
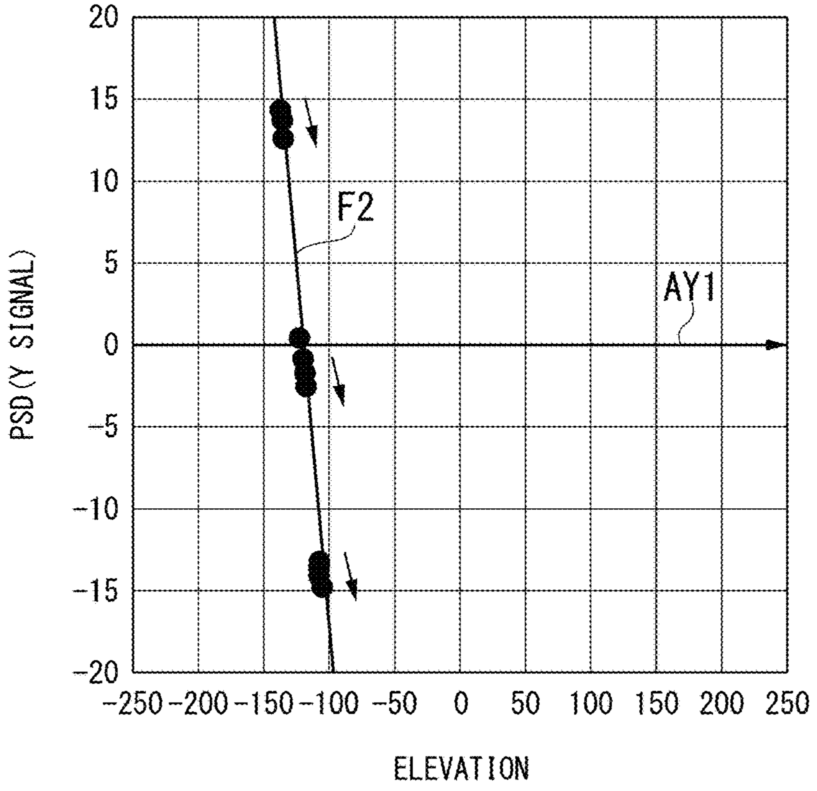
FIG. 17 is a diagram illustrating one example of the position of a reflective element inside a visual field of a 4-division PSD in a vertical direction with respect to an emission direction of an elevation direction of measurement light according to the first embodiment.
Figure 18:
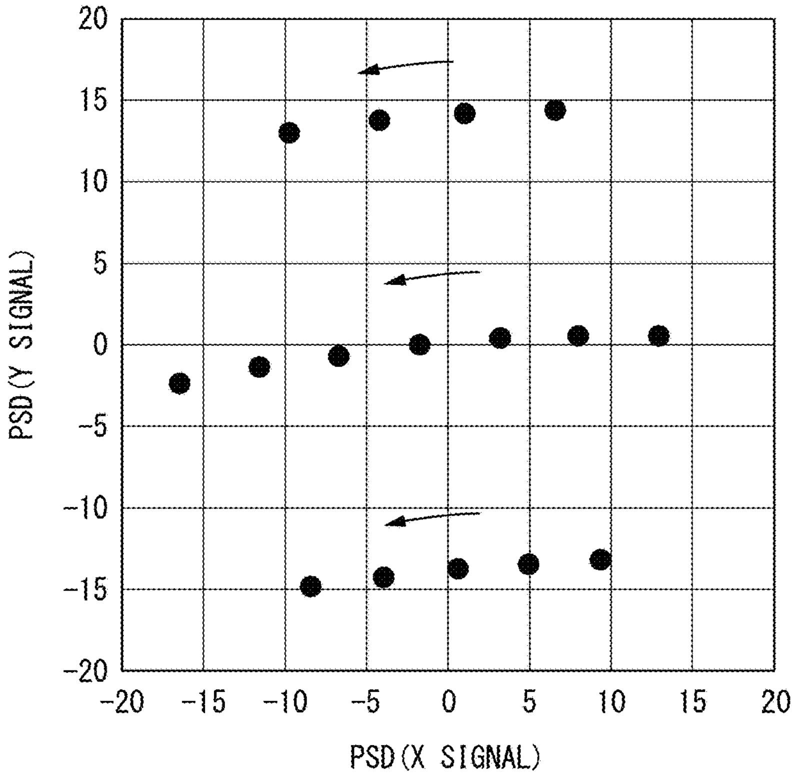
FIG. 18 is a diagram illustrating one example of a position of a reflective element inside a visual field of a 4-division PSD that is acquired as a result of scanning according to the first embodiment.

FIGS. 16, 17, and 18 illustrate a relation between the emission direction of the measurement light L1 and the position of the reflective element A11 inside the visual field of the 4-division PSD 12 that is acquired as a result of scanning. FIG. 16 illustrates a position of the reflective element A11 in a horizontal direction inside the visual field of the 4-division PSD 12 with respect to the emission direction of the azimuth direction of the measurement light L1. FIG. 17 illustrates a position of the reflective element A11 in a vertical direction inside the visual field of the 4-division PSD 12 with respect to the emission direction of the elevation direction of measurement light L1. FIG. 18 illustrates a position of the reflective element A11 inside the visual field of the 4-division PSD 12 that is acquired as a result of scanning.

From plots of the positions of the reflective element A11 inside the visual field of the 4-division PSD 12 represented in FIGS. 16 and 17, a direction of the visual field of the 4-division PSD 12 of a case in which the image of the reflective element A11 is detected at the center PC1 of the visual field of the 4-division PSD 12 is determined.

The control unit 21 approximates the plot of the position of the reflective element A11 inside the visual field of the 4-division PSD 12 illustrated in FIG. 16 as a straight line on the basis of a least-squares method. A straight line F1 represents a straight line acquired through this approximation. The control unit 21 determines an azimuth direction represented by an intersection between the straight line F1 and an axis AX1 as the emission direction of the azimuth direction of the measurement light L1 of a case in which the image of the reflective element A11 is detected at the center PC1 of the visual field of the 4-division PSD 12. The axis AX1 is a horizontal axis of a coordinates plane illustrated in FIG. 16 and represents a position of the center PC1 of the visual field of the 4-division PSD 12 in a horizontal direction.

Similarly, the control unit 21 approximates the plot of the position of the reflective element A11 inside the visual field of the 4-division PSD 12 illustrated in FIG. 17 as a straight line on the basis of a least-squares method. A straight line F2 represents a straight line acquired through this approximation. The control unit 21 determines an elevation direction represented by an intersection between the straight line F2 and an axis AY1 as the emission direction of the elevation direction of the measurement light L1 of a case in which the image of the reflective element A11 is detected at the center PC1 of the visual field of the 4-division PSD 12. The axis AY1 is a horizontal axis of a coordinates plane illustrated in FIG. 17 and represents the position of the center PC1 of the visual field of the 4-division PSD 12 in a vertical direction.

As above, the control unit 21 determines each of the emission direction of the azimuth direction of the measurement light L1 and the emission direction of the elevation direction of a case in which the image of the reflective element A11 is detected at the center PC1 of the visual field of the 4-division PSD 12. The control unit 21 determines the determined emission direction of the measurement light L1 as the position of the center of the reflective element A11.

Figure 19:
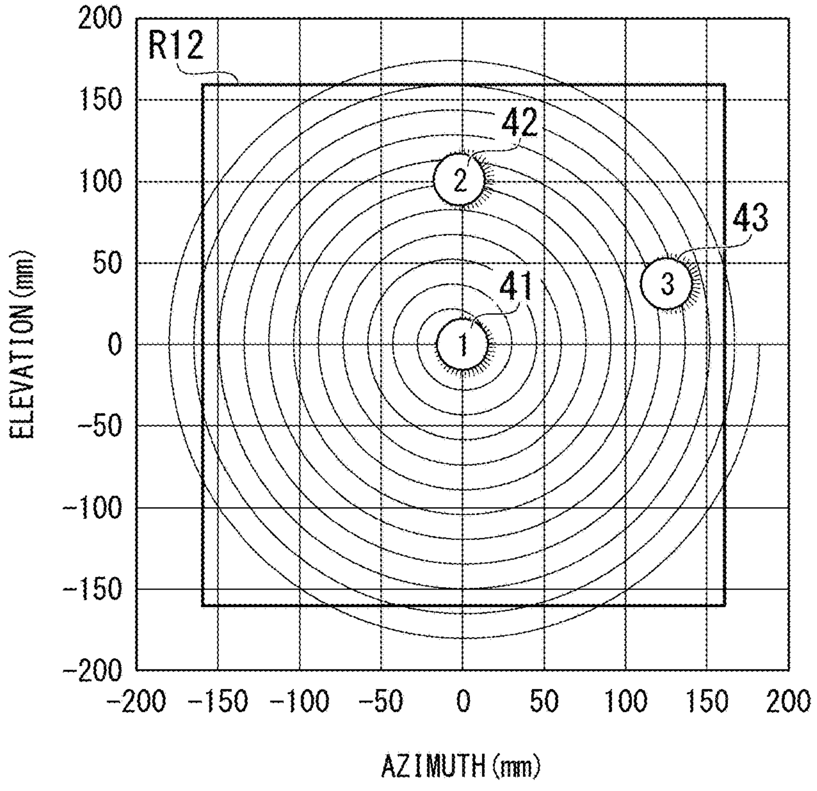
FIG. 19 is a diagram illustrating one example of area scanning according to the first embodiment.

Next, a case in which a position of the center of each of a plurality of reflective elements is estimated will be described with reference to FIGS. 19, 20, and 21. FIG. 19 is a diagram illustrating one example of area scanning according to this embodiment. An estimation range R12 represents a predetermined range based on a position of the marker 44 that has been estimated by the stereo camera 3. When FIG. 19 is compared with FIG. 13, FIG. 19 is similar to FIG. 13 except that three reflective elements (reflective elements 41, 42, and 43) are positioned inside the estimation range R12.

Figure 20:
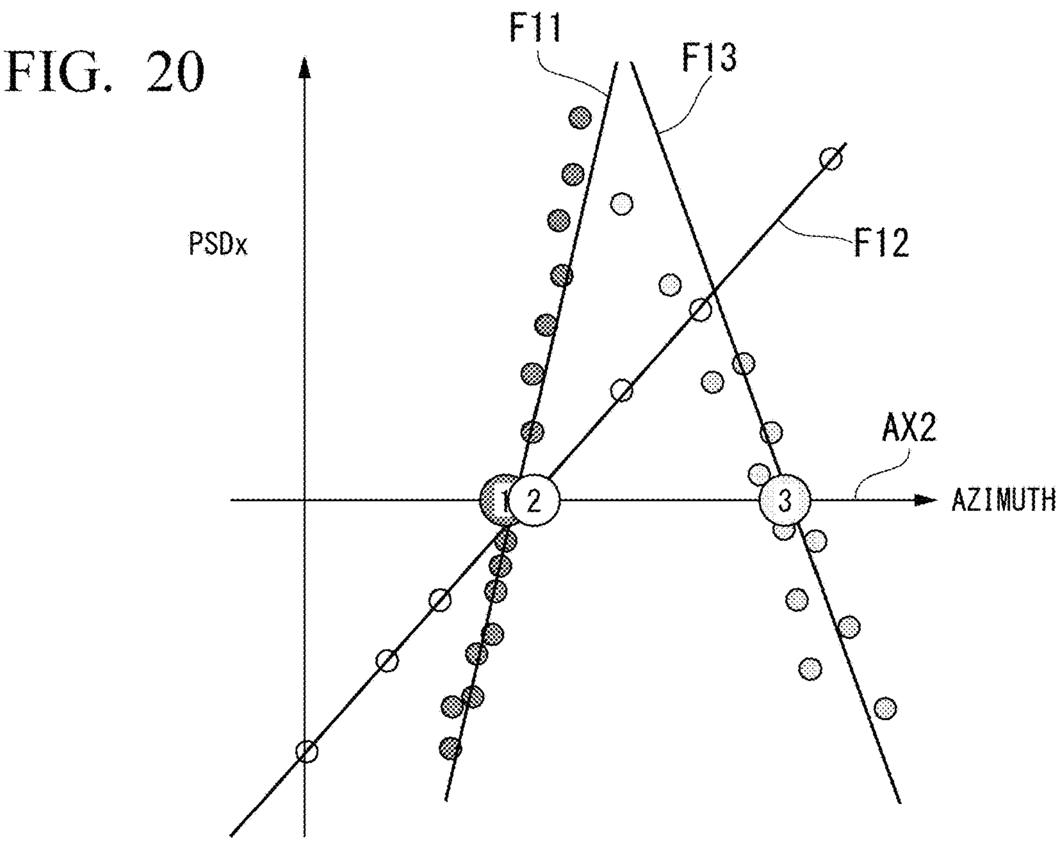
FIG. 20 is a diagram illustrating one example of positions of three reflective elements inside a visual field of 4-division PSDs in a horizontal direction with respect to an emission direction of an azimuth direction of measurement light according to the first embodiment.
Figure 21:
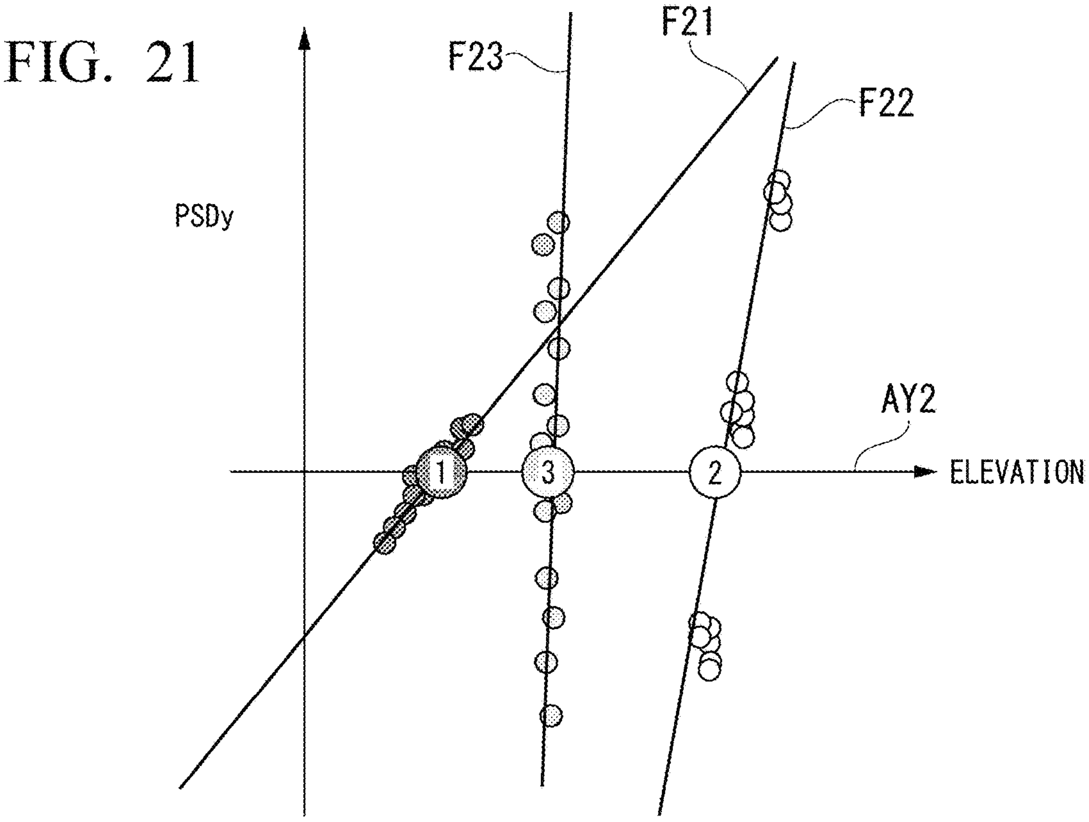
FIG. 21 is a diagram illustrating one example of positions of three reflective elements inside a visual field of a 4-division PSD in a vertical direction with respect to an emission direction of an elevation direction of measurement light according to the first embodiment.

FIGS. 20 and 21 illustrate a relation between the emission direction of the measurement light L1 and each of the positions of three reflective elements (reflective elements 41, 42, and 43) inside the visual field of the 4-division PSD 12 that is acquired as a result of scanning. FIG. 20 illustrates each of positions of three reflective elements (the reflective elements 41, 42, and 43) in a horizontal direction inside the visual field of the 4-division PSD 12 with respect to the emission direction of the azimuth direction of the measurement light L1. FIG. 21 illustrates each of positions of three reflective elements (the reflective elements 41, 42, and 43) in a vertical direction inside the visual field of the 4-division PSD 12 with respect to the emission direction of the elevation direction of measurement light L1.

As illustrated in FIGS. 20 and 21, in a case in which a plurality of reflective elements are positioned inside the estimation range R12, the plurality of reflective elements are detected by the 4-division PSD 12 without differentiating the plurality of reflective elements from each other. The control unit 21 classifies a detection result into a detection result of a specific reflective element among the plurality of reflective elements on the basis of a time at which the reflective element is detected.

In a case in which scanning is performed along a predetermined orbit of a spiral shape or the like, a time from detection of a certain reflective element to detection of this reflective element next time is determined in advance. The control unit 21 classifies detection results into detection results of respective reflective elements on the basis of this time. In the example illustrated in FIGS. 20 and 21, the control unit 21 classifies detection results into detection results of respective three reflective elements (the reflective elements 41, 42, and 43) on the basis of a time from detection of a certain reflective element to this reflective element next time in a case in which scanning is performed along an orbit of a spiral shape.

For detection results illustrated in FIG. 20, for every classified detection results, the control unit 21 approximates a plot represented by this detection result as a straight line on the basis of a least-squares method. In FIG. 20, a straight line F11 represents a straight line acquired through the approximation of a plot classified as detection results of the reflective element 41. A straight line F12 represents a straight line acquired through the approximation of a plot classified as detection results of the reflective element 42. A straight line F13 represents a straight line acquired through the approximation of a plot classified as detection results of the reflective element A23.

The control unit 21 determines an azimuth direction represented by an intersection between the straight line F11 and an axis AX2 as an emission direction of the azimuth direction of the measurement light L1 of a case in which the image of the reflective element 41 is detected at the center PC1 of the visual field of the 4-division PSD 12. The control unit 21 determines an azimuth direction represented by an intersection between the straight line F12 and the axis AX2 as an emission direction of the azimuth direction of the measurement light L1 of a case in which the image of the reflective element 42 is detected at the center PC1 of the visual field of the 4-division PSD 12. The control unit 21 determines an azimuth direction represented by an intersection between the straight line F13 and the axis AX2 as an emission direction of the azimuth direction of the measurement light L1 of a case in which the image of the reflective element A23 is detected at the center PC1 of the visual field of the 4-division PSD 12. The axis AX2 is a horizontal axis of the coordinates plane illustrated in FIG. 20 and represents a position of the center PC1 of the visual field of the 4-division PSD 12 in a horizontal direction.

Similarly, for detection results illustrated in FIG. 21, for every classified detection results, the control unit 21 approximates a plot represented by this detection result as a straight line on the basis of a least-squares method. In FIG. 21, a straight line F21 represents a straight line acquired through the approximation of a plot classified as detection results of the reflective element 41. A straight line F22 represents a straight line acquired through the approximation of a plot classified as detection results of the reflective element 42. A straight line F23 represents a straight line acquired through the approximation of a plot classified as detection results of the reflective element A23.

The control unit 21 determines an elevation direction represented by an intersection between the straight line F21 and an axis AY2 as an emission direction of the elevation direction of the measurement light L1 of a case in which the image of the reflective element 41 is detected at the center PC1 of the visual field of the 4-division PSD 12. The control unit 21 determines an elevation direction represented by an intersection between the straight line F22 and the axis AY2 as an emission direction of the elevation direction of the measurement light L1 of a case in which the image of the reflective element 42 is detected at the center PC1 of the visual field of the 4-division PSD 12. The control unit 21 determines an elevation direction represented by an intersection between the straight line F23 and the axis AY2 as an emission direction of the elevation direction of the measurement light L1 of a case in which the image of the reflective element A23 is detected at the center PC1 of the visual field of the 4-division PSD 12. The axis AY2 is a horizontal axis of the coordinates plane illustrated in FIG. 21 and represents a position of the center PC1 of the visual field of the 4-division PSD 12 in a vertical direction.

In addition, in this embodiment, although one example of a case in which the control unit 21 approximates detection results acquired using the 4-division PSD 12 as a straight line on the basis of the least squares method has been described, the method is not limited thereto. In a case in which detection results acquired using the 4-division PSD 12 are approximated as a straight line, the control unit 21 may use another fitting method.

Figure 22:
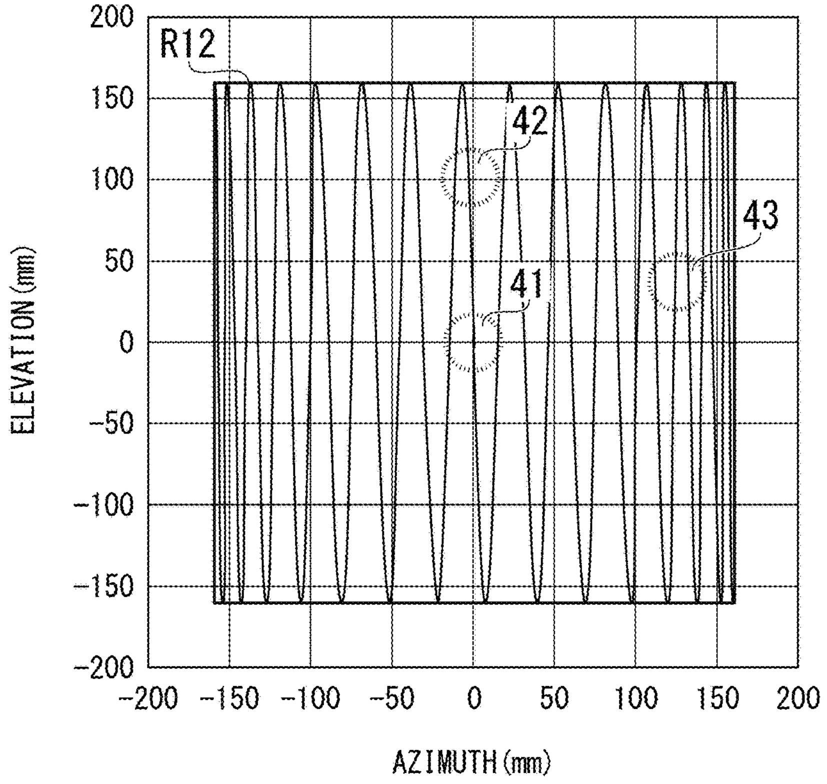
FIG. 22 is a diagram illustrating one example of area scanning of a case in which an orbit of measurement light according to the first embodiment is a wavy-line shape.

Furthermore, in this embodiment, although one example of a case in which the orbit of the measurement light L1 in area scanning is an orbit of a spiral shape has been described, the orbit is not limited thereto. The orbit of the measurement light L1 in area scanning may have a wavy line shape. FIG. 22 illustrates one example of area scanning of a case in which the orbit of the measurement light L1 has a wavy line shape. When FIG. 22 is compared with FIG. 19, FIG. 22 is similar to FIG. 19 except that the orbit of the measurement light L1 has a wavy line shape.

The description of the measurement process will be continued by referring back to FIG. 10.

The control unit 21 acquires a position and a posture (Step S30).

Figure 23:
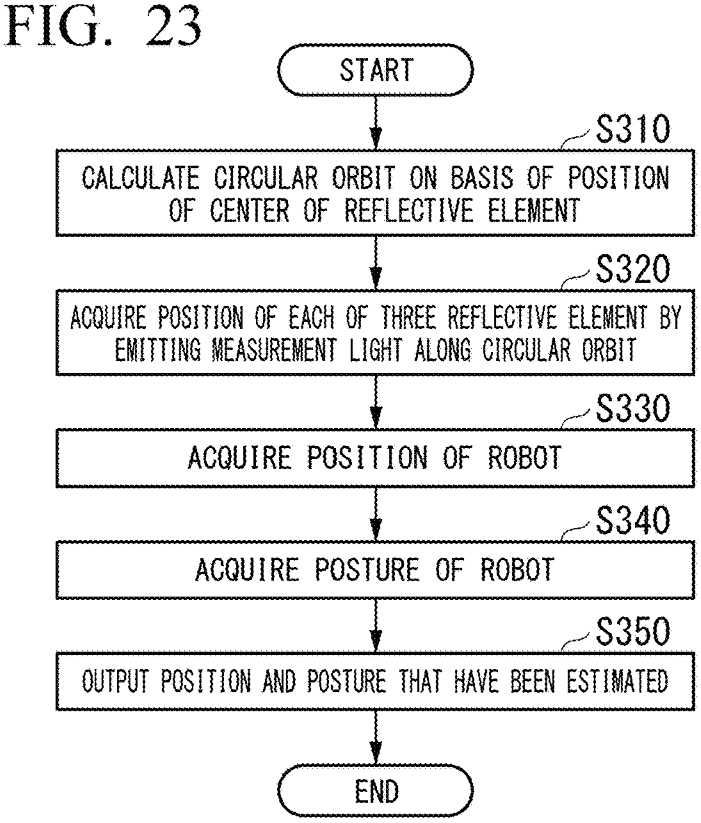
FIG. 23 is a diagram illustrating one example of a position/posture acquiring process according to the first embodiment.

Here, details of a position/posture acquiring process that is a process for acquiring a position and a posture will be described with reference to FIG. 23. FIG. 23 is a diagram illustrating one example of a position/posture acquiring process according to this embodiment.

The control unit 21 calculates a circular orbit TC1 on the basis of the position of the center of the reflective element (Step S310). The position of the center of the reflective element is a position of the center of each of three reflective elements (the reflective elements 41, 42, and 43) that has been estimated in the process of the fine search (Step S20). The circular orbit TC1 is one example of a predetermined orbit that can pass through the three reflective elements (the reflective elements 41, 42, and 43).

In addition, the process of calculating the circular orbit TC1 may be performed by a control device that is separated from the measurement device 1. This control device calculates an orbit (the circular orbit TC1 as one example) of the measurement light L1 passing though the three reflective elements (the reflective elements 41, 42, and 43) on the basis of measurement results acquired using the measurement light L1 by scanning a predetermined range along an orbit having a spiral shape that are measurement results acquired by the position acquiring unit 206. In addition, the control unit 21 is one example of a control device that controls the measurement device 1. In other words, in this embodiment, the measurement device 1 includes this control device as the control unit 21.

Figure 24:
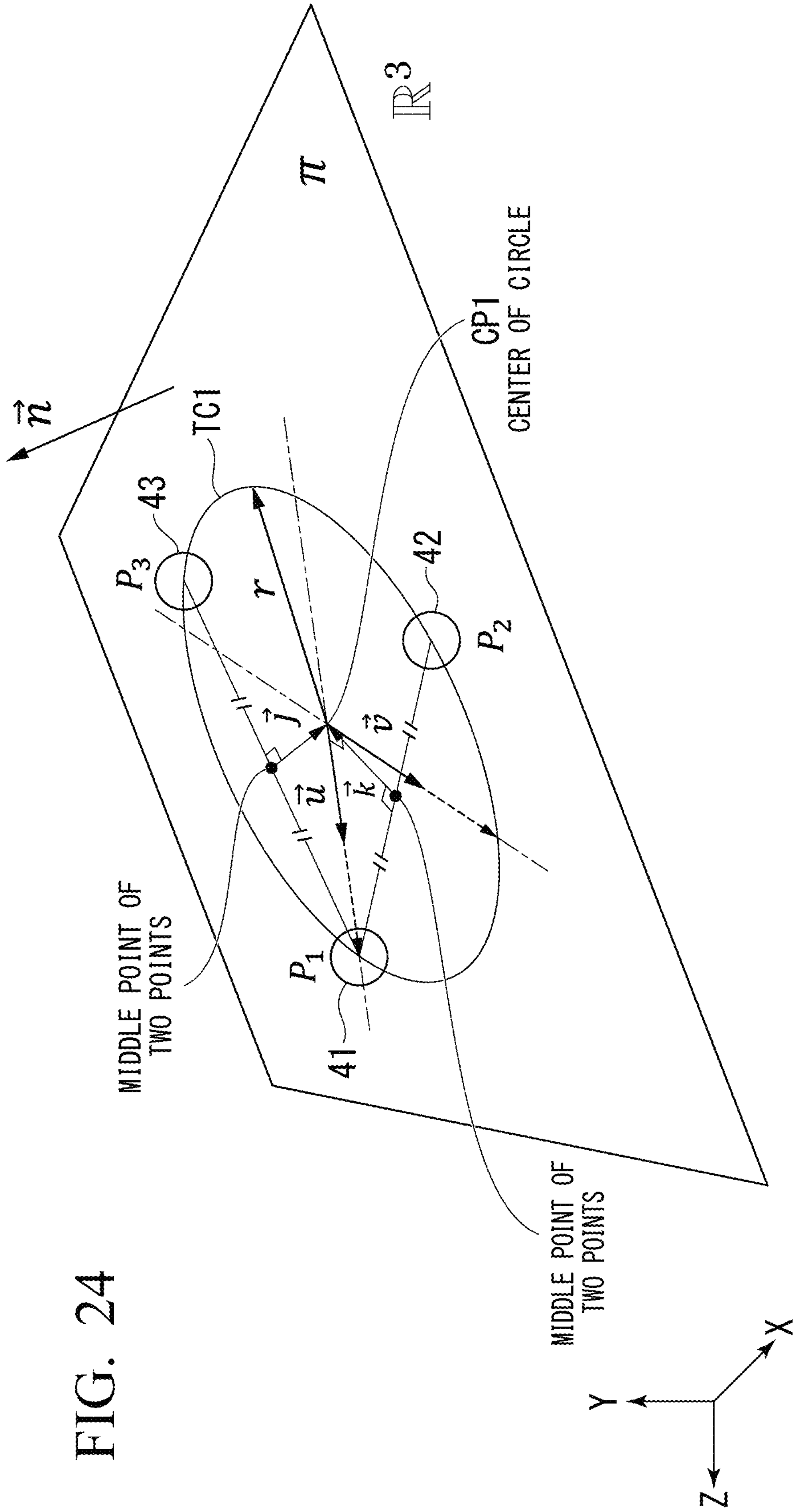
FIG. 24 is a diagram illustrating one example of a method of calculating a circular orbit according to the first embodiment.

Here, two methods will be described as a method of calculating the circular orbit TC1 with reference to FIG. 24. FIG. 24 is a diagram illustrating one example of a method of calculating a circular orbit TC1 according to this embodiment. In a first method for calculating a circular orbit TC1, an equation of a circle in a two-dimensional plane is expanded to an equation of a circle in a three-dimensional space.

In FIG. 24, positions P1, P2, and P3 respectively represent positions of centers of reflective elements 41, 42, and 43. A circular orbit TC1 represents a circle passing through the positions P1, P2, and P3.

An equation of a circle in a three-dimensional space is represented using Equation (1). In description of FIG. 24, a three-dimensional vector is represented by adding a symbol of an arrow to a character such as "X→".

[Math 1]

$$\vec{X} = \vec{A} + r\cos(t)\vec{u} + r\sin(t)\vec{v} \qquad (1)$$

Here, the three-dimensional vector X→ represents a position of the point of the circular orbit TC1 at an arbitrary time. A three-dimensional vector A→ represents a position of the center CP1 of a circle represented by the circular orbit TC1. r represents a radius of the circle represented by the circular orbit TC1. A three-dimensional vector u→ represents a unit vector having orientation from the center CP1 to the position P1 as its orientation. A three-dimensional vector v→ represents a unit vector that is orthogonal to the three-dimensional vector u→ in a two-dimensional plane 71 including the position P1 and positions P2 and P3. In addition, although there are two kinds of unit vectors that are orthogonal to the three-dimensional vector u→ in this two-dimensional plane π, the three-dimensional vector v→ may be any one of the two kinds of unit vectors. t represents a parameter that corresponds to a time.

In the example illustrated in FIG. 24, on the basis of the following three conditions, by solving simultaneous equations having a component of the three-dimensional vector A→, the three-dimensional vector A→ is calculated. A first condition is a condition that the center CP1 is on the two-dimensional plane 7*t*. A second condition is a condition that a vector having the position P1 as a start point and having the position P3 as an end point and a vector j→ having a middle point of the positions P1 and P3 as a start point and having the center CP1 as an end point are orthogonal to each other. A third condition is a condition that a vector having the position P1 as a start point and having the position P2 as an end point and a vector k→ having a middle point of the positions P1 and P2 as a start point and having the center CP1 as an end point are orthogonal to each other.

A second method for calculating the circular orbit TC1 is a method using a quaternion (also referred to as a hypercomplex number). In the method using a quaternion, coordinates of a point that is a target for rotation are associated with a quaternion p, and coordinates of a point after rotation are associated with a quaternion p'. A relation between the quaternion p and the quaternion p' is represented using Equation (2).

[Math 2]

$$p' = qpq^{-1} \qquad (2)$$

Here, the quaternion q represents a rotation axis and a rotation amount. A quaternion q−1 represents a quaternion that becomes a conjugate of the quaternion q.

A three-dimensional vector s→ representing coordinates of a point on an orbit at a time t is represented as in Equation (3).

[Math 3]

$$\vec{s} = \vec{A} + \vec{p'} \qquad (3)$$

Here, the three-dimensional vector A→ is a three-dimensional vector that represents coordinates of the center of the circular orbit TC1. A three-dimensional vector p'→ is a three-dimensional vector that corresponds to the quaternion p'.

In the method using the quaternion, compared to a method using a three-dimensional vector, an arithmetic operation load used for calculating rotation in a three-dimensional space can be decreased. For this reason, in the process of calculating the circular orbit TC1 on the basis of the position of the center of a reflective element, the method using a quaternion is appropriate.

The description of the position/posture acquiring process will be continued by referring back to FIG. 23.

By emitting measurement light L1 along the calculated circular orbit TC1, the control unit 21 acquires positions of the three reflective elements (the reflective elements 41, 42, and 43) (Step S320). By controlling the emission unit 201 and the emission direction driving unit 204, the control unit 21 acquires positions of the three reflective elements (the reflective elements 41, 42, and 43).

The control unit 21 acquires the position of the robot T1 (Step S330). The control unit 21 acquires the position of the robot T1 on the basis of the positions of the three reflective elements (the reflective elements 41, 42, and 43).

Here, the position of the robot T1 is a reference position of the target member 4 attached to the movable unit of the robot T1. For example, the reference position of the target member 4 is a predetermined position of a predetermined part of the target member 4. For example, the predetermined part of the target member 4 is a part of the target member 4 that is close to the movable unit of the robot T1. For example, the predetermined part of the target member 4 is an installation member 45 to be described below. For example, the predetermined position of the predetermined part of the target member 4 is a position of the center of a face of the installation member 45 that is brought into contact with the movable unit of the robot T1, a position of the center of an installation face 46 to be described below, or the like.

In a case in which the position of the movable unit of the robot T1 moves, the reference position of the target member 4 attached to this movable unit is moved. The position information of the robot T1 is information that represents a reference position of the target member 4 attached to the movable unit of the robot T1.

Each of positions of the three reflective elements (the reflective elements 41, 42, and 43) and the reference position of the target member 4 have a predetermined positional relation. The control unit 21 calculates the reference position of the target member 4 on the basis of the positions of the three reflective elements (the reflective elements 41, 42, and 43). In other words, the control unit 21 acquires the position information of the robot T1 on the basis of the position information of each of the three reflective elements (the reflective elements 41, 42, and 43).

Here, the emission unit 201 can scan the measurement light L1 along a predetermined orbit (a circular orbit TC1) that can pass through the three reflective elements (the reflective elements 41, 42, and 43). In addition, while scanning along the circular orbit TC1 at a predetermined speed or more, the emission unit 201 sequentially emits the measurement light L1 to the three reflective elements (the reflective elements 41, 42, and 43). In other words, while scanning along a predetermined orbit at a predetermined speed or more, the emission unit 201 can sequentially emit the measurement light L1 to the three reflective elements (the reflective elements 41, 42, and 43).

Here, in order to acquire information relating to the position information of the robot T1 that is a measurement target and a position thereof in a rotation direction, it is necessary to acquire position information of at least three reflective elements attached to the robot T1. In order to acquire information relating to the position information of the robot T1 and a position thereof in the rotation direction at a certain time, it is required that a difference between times at which position information of the three reflective elements (the reflective elements 41, 42, and 43) is acquired be as small as possible (in other words, the position information of the three reflective elements be acquired at the same time as possibly).

In the measurement device 1 according to this embodiment, the emission unit 201 includes one optical comb interferometer 11. In the measurement device 1 according to this embodiment, the emission unit 201 sequentially emits the measurement light L1 to the three reflective elements (the reflective elements 41, 42, and 43) while scanning along a predetermined orbit at a predetermined speed or more. For this reason, in the measurement device 1 according to this embodiment, even in a case in which only one optical comb interferometer 11 is included, a difference between times at which position information of the three reflective elements (the reflective elements 41, 42, and 43) is acquired can be configured to be small.

As described above, the circular orbit TC1 is an orbit that is calculated on the basis of a detection result (a result of a fine search) of a position of each of the three reflective elements (the reflective elements 41, 42, and 43) acquired using the 4-division PSD 12. A detection result of a position acquired using the 4-division PSD 12 is a result of imaging performed by the first imaging unit 22. In other words, the circular orbit TC1 is an orbit calculated on the basis of imaging results of the three reflective elements (the reflective elements 41, 42, and 43) acquired using the first imaging unit 22. In addition, as described above, the measurement light L1 is emitted along the circular orbit TC1. Thus, the measurement light L1 is emitted on the basis of the imaging results of the three reflective elements (the reflective elements 41, 42, and 43) acquired using the first imaging unit 22.

In addition, in this embodiment, as described above, in order to perform a fine search using the 4-division PSD 12, a rough search in which the marker 44 is imaged using the stereo camera 3 in advance is performed. In other words, a fine search using the first imaging unit 22 is performed on the basis of a result of imaging of the marker 44 performed using the second imaging unit 30. Thus, the measurement light L1 is emitted on the basis of an imaging result acquired using the second imaging unit 30.

In addition, in this embodiment, one example of a case in which, in order to scan the measurement light L1 along a predetermined orbit enabling the emission unit 201 to pass through three reflective elements (the reflective elements 41, 42, and 43), a circular orbit TC1 is calculated as this predetermined orbit has been described. The circular orbit TC1 is one example of an orbit in which a change of the acceleration of the change of the measurement light L1 in the emission direction becomes small. In other words, in this embodiment, in order to enable the emission unit 201 to perform scanning along a predetermined orbit, the position acquiring unit 206 calculates an orbit in which a change of the acceleration of the change of the measurement light L1 in the emission direction becomes small as this predetermined orbit. Another example of an orbit in which a change of the acceleration of the change of the measurement light L1 in the emission direction becomes small is an elliptical orbit. In that case, the position acquiring unit 206 calculates an elliptical orbit as the predetermined orbit in Step S310. In addition, another example of an orbit in which a change of the acceleration of the change of the measurement light L1 in the emission direction becomes small is a Lissajous orbit. In that case, the position acquiring unit 206 calculates a Lissajous orbit as the predetermined orbit in Step S310.

In a case in which a predetermined orbit that can pass through three reflective elements (the reflective elements 41, 42, and 43) is an orbit in which a change of the acceleration of the change of the measurement light L1 in the emission direction becomes small, compared to an orbit in which a change of the acceleration is not small, a load on the gimbal unit of the PMA 14 included in the emission direction driving unit 204 is reduced.

In addition, a polygonal orbit may be calculated as a predetermined orbit that can pass through three reflective elements (the reflective elements 41, 42, and 43). In order to decrease a change of the acceleration of the change of the measurement light L1 in the emission direction, it is preferable that a polygon having the same number of apexes as the number of a plurality of reflective elements among polygons be calculated as the predetermined orbit.

In addition, as the predetermined orbit for scanning the measurement light L1, a circular orbit, an elliptical orbit, a polygonal orbit, or any other orbit (a curved orbit or the like) may be calculated. Also in that case, it is preferable that an orbit in which a change of the acceleration of the change of the measurement light L1 in the emission direction becomes small be calculated.

The control unit 21 acquires a posture of the robot T1 on the basis of the acquired positions of three reflective elements (the reflective elements 41, 42, and 43) (Step S340).

Here, the posture of the robot T1 is a position (a posture and orientation) of the target member 4, which is attached to the movable unit of the robot T1, in the rotation direction. The position of the target member 4 in the rotation direction, for example, is a position of a part of the target member 4, which is close to the movable unit of the robot T1, in the rotation direction. The position of the target member 4 in the rotation direction, for example, is a position of the installation member 45 to be described below in the rotation direction, a position of the installation face 46 to be described below in the rotation direction, or the like.

In a case in which the position of the movable unit of the robot T1 in the rotation direction changes, the position of the target member 4, which is attached to this movable unit, in the rotation direction is changed. Direction information of the robot T1 is information that represents direction information of the target member 4 attached to the movable unit of the robot T1.

A position of each of the three reflective elements (the reflective elements 41, 42, and 43) and a position of the target member 4 in the rotation direction have a predetermined relation. The control unit 21 calculates the position of the target member 4 in the rotation direction on the basis of the positions of the three reflective elements (the reflective elements 41, 42, and 43). In other words, the control unit 21 acquires direction information of the robot T1 (a posture or orientation or the robot T1) on the basis of the position information of each of the three reflective elements (the reflective elements 41, 42, and 43).

Here, a posture acquiring process that is a process of acquiring the posture of the robot T1 will be described with reference to FIGS. 25 to 27. In this embodiment, although a case in which three reflective elements are attached to the robot T1 is described, in description of the posture acquiring process, one example of a case in which four reflective elements are attached to the robot T1 will be described. The posture acquiring process of a case in which three reflective elements are attached to the robot T1 is similar to a posture acquiring process of a case in which four reflective elements are attached to the robot T1.

Figure 25:
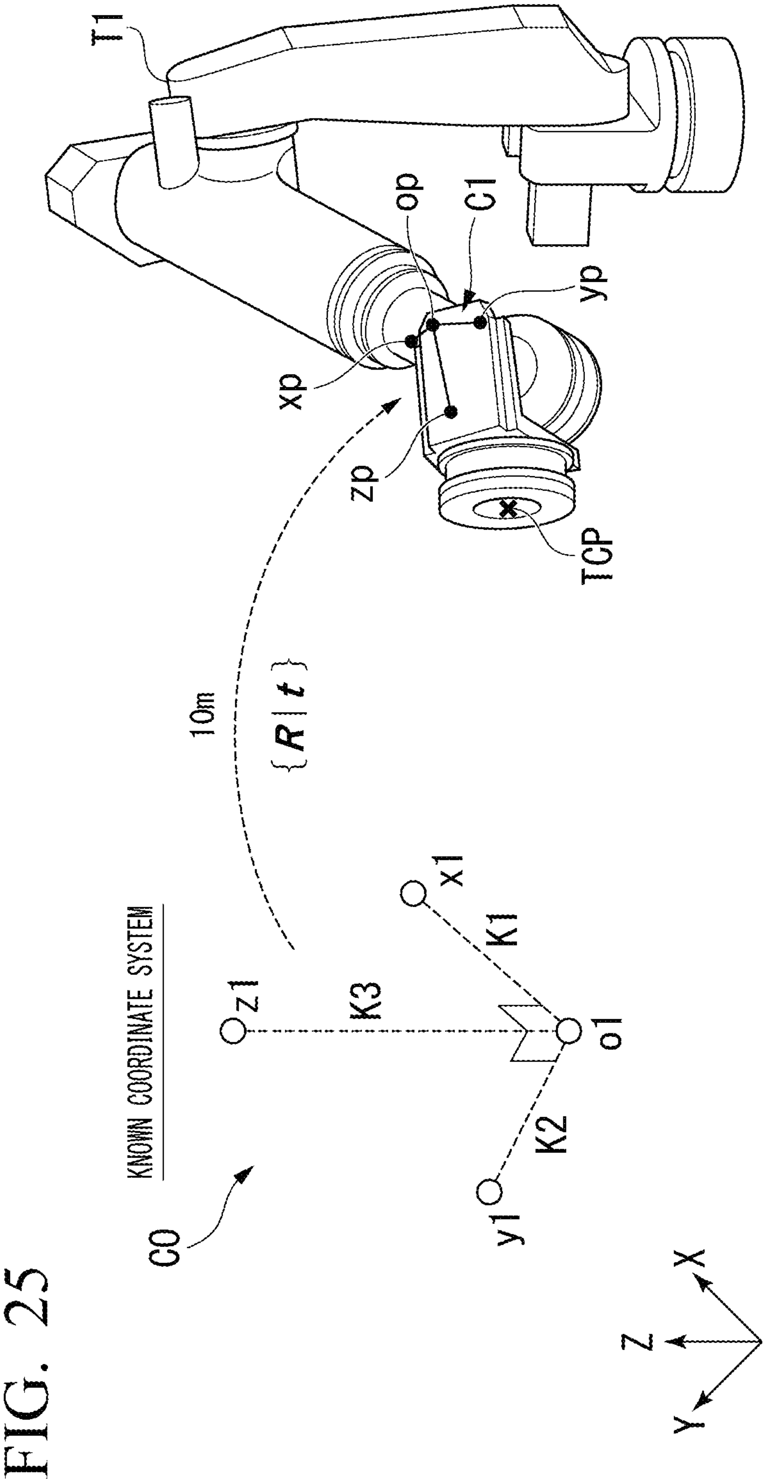
FIG. 25 is a diagram illustrating one example of an overview of a posture acquiring process according to the first embodiment.

FIG. 25 is a diagram illustrating one example of an overview of a posture acquiring process according to this embodiment. In the posture acquiring process, as one example, a known coordinate system is fitted to a plurality of reflective elements. The fitting of a known coordinate system to a plurality of reflective elements is superimposing a plurality of points of which coordinates are known in a known coordinate system on positions of the centers of the plurality of reflective elements by rotating and/or translating the points. In the posture acquiring process, the posture (the direction) of the robot T1 to which a plurality of reflective elements are attached is estimated on the basis of a known coordinate system fitted to the plurality of reflective elements.

Here, a relation of positions of centers of a plurality of reflective elements is assumed to be known. The relation of positions of centers of a plurality of reflective elements being known corresponds to the relation of positions of centers of a plurality of reflective elements being known in a state in which the plurality of reflective elements are attached to a target member. As described above, the relation of positions of centers of a plurality of reflective elements in a state in which the plurality of reflective elements are attached to a target member is stored in the storage unit 24 in advance as reflective element arrangement information.

In addition, the number of a plurality of points of which coordinates are known in a known coordinate system is the same as the number of the plurality of reflective elements.

In FIG. 25, points xp, yp, zp, and op respectively represent positions of centers of four reflective elements.

In the example illustrated in FIG. 25, a known coordinate system C0 is illustrated as the known coordinate system. As one example, the known coordinate system C0 is an orthogonal coordinate system having a point o1 as its origin. A point x1 is a point on the x axis of the known coordinate system C0, and an x coordinate of the point x1 is a coordinate K1. A point y1 is a point on the y axis of the known coordinate system C0, and a y coordinate of the point y1 is a coordinate K2. A point z1 is a point on the z axis of the known coordinate system C0, and a z coordinate of the point z1 is a coordinate K3. In the known coordinate system C0, the coordinate K1 is the same as the length of a side joining the points xp and op, the coordinate K2 is the same as the length of a side joining the points yp and op, and the coordinate K3 is the same as the length of a side joining the points zp and op.

In addition, as the known coordinate system C0, for example, the reference coordinate system described above (a coordinate system inside a space in which the target member 4 is disposed) may be selected.

In the posture acquiring process, the points x1, y1, z1, and o1 are respectively superimposed onto the points xp, yp, zp, and op through an operation of rotation and/or translation. Here, in the process of rotation and/or translation, mutual positional relation among the points x1, y1, z1, and o1 is not changed. In other words, the operation of rotation and/or translation are common to a plurality of points of which coordinates are known in a known coordinate system.

In FIG. 25, as one example, a length of the side joining the points xp and op, a length of the side joining points yp and op, and a length of the side joining points zp and op are assumed to be different from each other. Thus, the coordinates K1, K2, and K3 are different from each other. For this reason, in the example illustrated in FIG. 25, in a case in which the points x1, y1, z1, and o1 are respectively superimposed onto the points xp, yp, zp, and op through an operation of rotation and/or translation, the superimposition (fitting) method becomes unique.

In order to fit a known coordinate system to a plurality of reflective elements, coordinates changes representing rotation and/or translation need to be calculated. In this embodiment, as one example, a matrix representing rotation among matrixes representing coordinates changes is calculated on the basis of a principal component analysis.

Here, a three-dimensional vector Ai (here, i=1, 2, . . . , N; N is the number of a plurality of points of which coordinates are known in a known coordinate system and is 4 in a case in which four reflective elements are attached to the robot T1) representing positions of a plurality of points of which coordinates are known in a known coordinate system and a three-dimensional vector Bi (here, i=1, 2, . . . , N; N is the number of reflective elements and is 4 in a case in which four reflective elements are attached to the robot T1) representing positions of a plurality of reflective elements will be considered. In addition, in a case in which three reflective elements are attached to the robot T1, N is 3.

By performing singular value decomposition for a matrix H represented using Equation (4), a matrix R representing rotation can be calculated.

[Math 4]

$$H=(A-\text{centroid}_A)(B-\text{centroid}_B)^T \tag{4}$$

Here, a matrix A is a matrix acquired by aligning the three-dimensional vector Ai as columns. The matrix A represents a set of points represented by the three-dimensional vector Ai. A matrix B is a matrix acquired by aligning the three-dimensional vector Bi as columns. The matrix B represents a set of points represented by the three-dimensional vector Bi. A matrix centroid A, as represented in Equation (5), is a matrix acquired by aligning a three-dimensional vector representing positions of centers of gravities of a plurality of points of which coordinates are known in a known coordinate system as columns.

[Math 5]

$$\text{centroid}_A=\frac{1}{N}\sum_{i=1}^{N}A^i \tag{5}$$

A matrix centroid B, as represented in Equation (6), is a matrix acquired by aligning a three-dimensional vector representing positions of centers of gravities of positions of a plurality of reflective elements as columns.

[Math 6]

$$\text{centroid}_B = \frac{1}{N}\sum_{i=1}^{N} B^i \tag{6}$$

As represented in Equation (4), in a matrix H, a matrix acquired by subtracting the matrix centroid A from the matrix A is multiplied by a transposed matrix of a matrix acquired by decreasing the matrix centroid B from the matrix B. Thus, by taking the matrix H into account, a problem of a set of the points represented by the matrix A overlapping with a set of the points represented by the matrix B can be reduced in advance to a problem of overlapping through rotation by reducing components that overlap each other through translation.

In order to calculate this rotation, as represented in Equation (7), singular value decomposition is performed for the matrix H.

[Math 7]

$$[U, S, V] = SVD(H) \tag{7}$$

Here, singular value decomposition for a certain matrix E is defined using Equations (8) and (9).

[Math 8]

$$[U, S, V] = SVD(E) \tag{8}$$

[Math 9]

$$E = USV^T \tag{9}$$

In Equations (8) and (9), a matrix U is a left singular vector matrix, a matrix V is a right singular vector matrix, and a matrix S is a matrix having singular values as its diagonal elements.

As represented in Equation (7), when the matrix V and the matrix U acquired as a result of the singular value decomposition for the matrix H are used, a matrix R representing rotation of a case in which a set of points represented by the matrix A and a set of points represented by the matrix B overlap each other is calculated as in Equation (10).

[Math 10]

$$R = VU^T \tag{10}$$

Next, a matrix t representing translation is calculated. The matrix A and the matrix B are represented as in Equation (11) using the matrix R representing rotation and the matrix t representing translation.

[Math 11]

$$R \times A + t = B \tag{11}$$

When the matrix centroid A and the matrix centroid B described above are used, Equation (12) is acquired from Equation (11).

[Math 12]

$$R \times \text{centroid}_A + t = \text{centroid}_B \tag{12}$$

From Equation (12), the matrix t representing translation is calculated as represented in Equation (13) using the matrix R representing rotation, the matrix centroid A, and the matrix centroid B.

[Math 13]

$$t = \text{centroid}_B - R \times \text{centroid}_A \tag{13}$$

Figure 26:
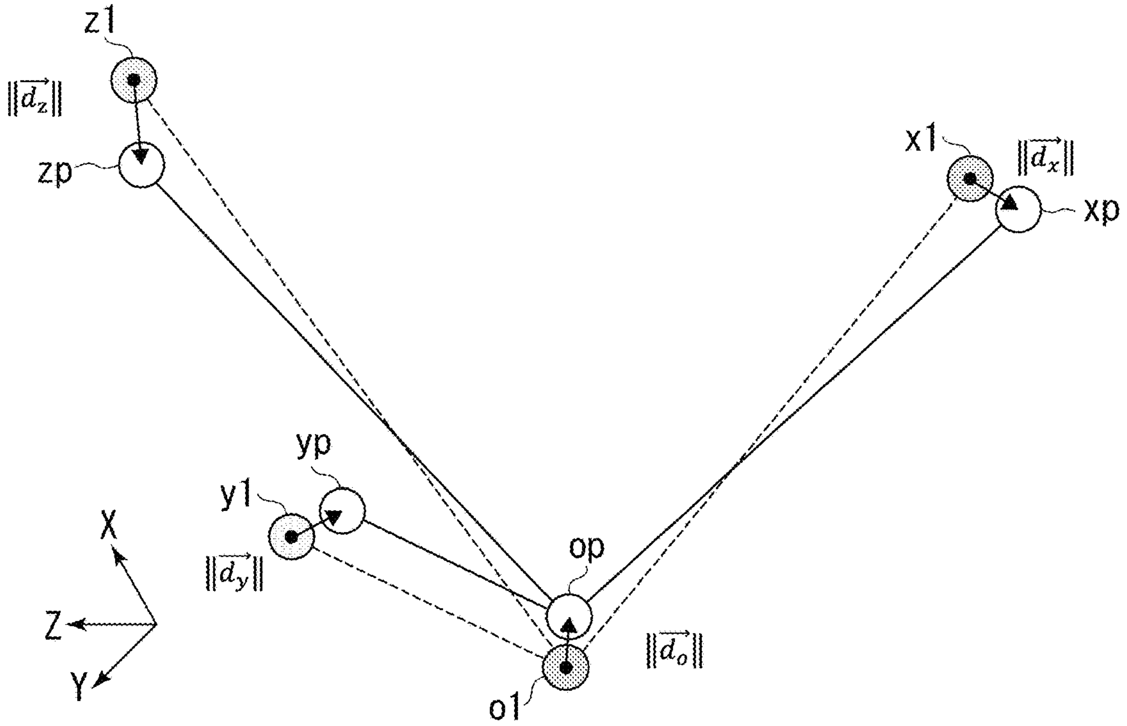
FIG. 26 is a diagram illustrating one example of a process of superposing four points of which coordinates in an existing coordinate system are known into positions of four reflective elements according to the first embodiment.

FIG. 26 illustrates one example of a process of superimposing points x1, y1, z1, and o1 that are four points of which coordinates are known in a known coordinate system C0 onto positions of four reflective elements. Points xp, yp, zp, and op represent positions of four reflective elements. Rotation and/or translation of the points x1, y1, z1, and o1 is performed such that the points x1, y1, z1, and o1 are respectively superimposed onto points xp, yp, zp, and op. By superimposing the points x1, y1, z1, and o1 respectively onto the points xp, yp, zp, and op, the known coordinate system C0 and a target coordinate system C1 are associated with each other.

By only measuring positions of a plurality of reflective elements, each of the plurality of reflective elements cannot be identified. After fitting the known coordinate system C0 to the plurality of reflective elements, each of the plurality of reflective elements and each of a plurality of points of which coordinates are known in the known coordinate system C0 are associated with each other. For this reason, after the known coordinate system C0 is fitted to the plurality of reflective elements, each of the plurality of reflective elements can be identified.

In addition, after the known coordinate system C0 is fitted to the plurality of reflective elements, various arithmetic operations can be performed on the basis of the known coordinate system C0. For example, the various arithmetic operations include calculation of a position of a tool center point of the robot T1, various POST processes, and the like. For example, the calculation of the position of the tool center point of the robot T1 is performed by the position acquiring unit 206. In other words, the position acquiring unit 206 acquires information relating to the tool center point of the robot T1.

In the process described above, although a case in which the length of the side joining the points xp and op, the length of the side joining the points yp and op, and the length of the side joining the points zp and op are different from each other, and a method of superimposing a known coordinate system onto the plurality of reflective elements is unique has been described, the configuration is not limited thereto. Some of the length of the side joining the points xp and op, the length of the side joining the points yp and op, and the length of the side joining the points zp and op may be the same.

In a case in which some of the length of the side joining the points xp and op, the length of the side joining the points yp and op, and the length of the side joining the points zp and op are the same, the method of superimposing a known coordinate system onto a plurality of reflective elements is not unique. In accordance with the method of superimposing a known coordinate system onto a plurality of reflective elements being not unique, some of the plurality of reflective elements are unable to be identified, and thus there are cases in which the orientation of the target member in which the plurality of reflective elements are disposed cannot be uniquely determined.

For example, in a case in which four reflective elements are disposed at positions corresponding to apexes of a regular tetrahedron, a plurality of points of which coordinates are known in a known coordinate system have coordinates corresponding to the apexes of the regular tetrahedron. In a case in which a regular tetrahedron having a plurality of point of which coordinates are known in a known coordinate system at its apexes is superimposed onto a regular tetrahedron having centers of four reflective elements at its apexes, the superimposition method is not unique, and thus the orientation of a target member in which these four reflective elements are disposed cannot be uniquely determined.

In addition, even in a case in which the orientation of a target member cannot be uniquely determined, it can be determined that the orientation of the target member is one of a plurality of orientations.

FIG. 26 represents error of measurement of the position of the target member 4 that is performed by the measurement device 1. This error is error of coordinates of each of the points xp, yp, zp, and op measured by the measurement device 1 with respect to the coordinates of each of the points x1, y1, z1, and o1 that are four points of which the coordinates are known in the known coordinate system C0.

In FIG. 26, an error vector representing error using the magnitude thereof is represented for each of the points xp, yp, zp, and op. An error vector dx→ represents error of the position of the point x1 with respect to the position of the point xp. An error vector dy→ represents error of the position of the point y1 with respect to the position of the point yp. An error vector dz→ represents error of the position of the point z1 with respect to the position of the point zp. An error vector do→ represents error of the position of the point o1 with respect to the position of the point op.

Figure 27:
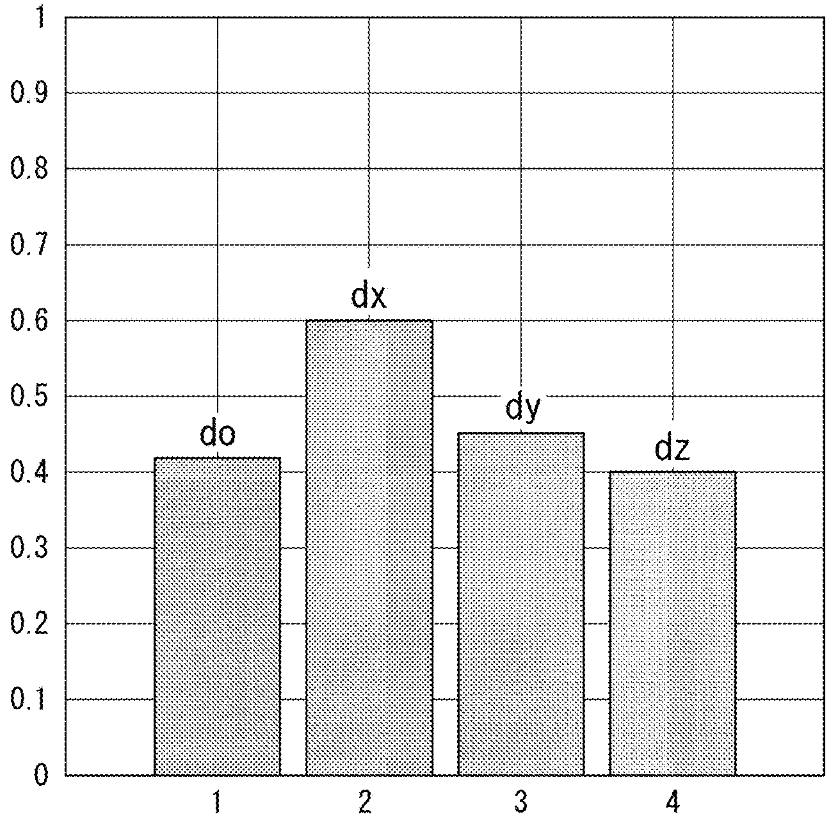
FIG. 27 is a diagram illustrating one example of a graph representing magnitudes of error vectors according to the first embodiment.

FIG. 27 illustrates a graph representing magnitudes of error vectors. According to FIG. 27, the magnitude of the error vector is about 0.6 μm. In a case in which accuracy of measurement of the position of the target member 4 that is performed by the measurement device 1 is about 1 am, accuracy of measurement of the position and the posture of the target member 4 becomes about 0.6 μm. In a case in which accuracy of measurement of the position of the target member 4 that is performed by the measurement device 1 is about 1 nm, accuracy of measurement of the position and the posture of the target member 4 is expected to be on the sub-nanometer scale.

The description of the position/posture acquiring process will be continued by referring to FIG. 23.

The control unit 21 outputs the position and the posture that have been estimated (Step S350). The control unit 21 outputs position information representing the estimated position and direction information representing the estimated posture to the robot T1. For example, the control unit 21 outputs the information by transmitting the information to a control system of the robot T1.

In this way, the control unit 21 ends the position/posture acquiring process.

In addition, in this embodiment, although one example of a case in which the position and the posture of the robot T1 are not changed while the measurement device 1 is performing the measurement process has been described, the configuration is not limited thereto. While the measurement device 1 is performing the measurement process, the position and the posture of the robot T1 may be changed. In a case in which the position and the posture of the robot T1 are changed during the measurement process, between times at which measurement light L1 is sequentially emitted to three reflective elements (the reflective elements 41, 42, and 43), positions and postures of the three reflective elements (the reflective elements 41, 42, and 43) may be changed.

In a case in which the position and the posture of the robot T1 are changed during the measurement process, the measurement device 1, for example, may estimate positions of the three reflective elements (the reflective elements 41, 42, and 43) on the basis of a difference in time at which the measurement light L1 is emitted to each of the three reflective elements (the reflective elements 41, 42, and 43). The measurement device 1, for example, may estimate positions of three reflective elements (the reflective elements 41, 42, and 43) at a certain time from a difference between a time at which the measurement light L1 is emitted to the reflective element 41 and a time at which the measurement light L1 is emitted to the reflective element 42 and a difference between a time at which the measurement light L1 is emitted to the reflective element 42 and a time at which the measurement light L1 is emitted to the reflective element 43. The measurement device 1 may acquire the position and the posture of the robot T1 on the basis of results of estimation of the positions of the three reflective elements (the reflective elements 41, 42, and 43) at a certain time.

The measurement device 1 may use a measurement value for the position of one of the three reflective elements (the reflective elements 41, 42, and 43) and may use an estimated value for the position of each of the remaining two reflective elements. For example, in a case in which a time at which the position of the reflective element 42 is measured (that is, a time at which the measurement light L1 is emitted to the reflective element 42) is used as a reference time, the measurement device 1 uses a measurement value for the position of the reflective element 42. The measurement device 1 calculates estimated values at the reference time for the position of the reflective element 41 and the time of the reflective element 43. In addition, a time at which the position of the reflective element 41 is measured or a time at which the position of the reflective element 43 is measured may be set as a reference time.

In addition, even in a case in which the position and the posture of the robot T1 are changed during the measurement process, the measurement device 1 may directly use a measurement result of the position of each of the three reflective elements (the reflective elements 41, 42, and 43) as position information by ignoring a time difference between times at which positions of the three reflective elements (the reflective elements 41, 42, and 43) are respectively measured. A case in which a time difference between times at which positions of the three reflective elements are measured can be ignored is a case in which this time difference is extremely short, and thus changes in the position and the posture of the robot T1 during the measurement process is about measurement accuracy of the measurement device 1.

In addition, the robot T1 may be caused to temporarily stop during the measurement process. In that case, for example, a measurement start signal that is a signal indicating a measurement start may be transmitted from the control system of the robot T1 to the measurement device 1. In a case in which the measurement start signal is transmitted from the control system of the robot T1 to the measurement device 1, this control system causes the robot T1 to be temporarily stopped and then transmits the measurement start signal to the measurement device 1. In addition, a stop signal indicating a command for temporary stopping the robot T1 may be transmitted from the measurement device 1 to the control system of the robot T1. In a case in which the stop signal is transmitted from the measurement device 1 to the control system of the robot T1, this control system temporarily stops the robot T1 on the basis of the stop signal. This control system transmits a signal indicating that the robot T1 has stopped to the measurement device 1.

In any one of the case in which the measurement start signal is transmitted and the case in which the stop signal is transmitted, the measurement device 1 starts a measurement process after checking that the robot T1 has stopped.

As described above, in the position/posture acquiring process, the position acquiring unit 206 acquires position information and direction information on the basis of information relating to positions of three reflective elements (the reflective elements 41, 42, and 43). The information relating to positions of three reflective elements (the reflective elements 41, 42, and 43) is information that represents positions of the three reflective elements (the reflective elements 41, 42, and 43) that have been detected by the 4-division PSD 12 as one example in this embodiment. The position information is represented using coordinates of a reference coordinate system inside a space in which the target member 4 is disposed as one example and represents a position inside the rectangular coordinates (X, Y, Z). In that case, the position information is position information relating to a first axis (the X axis), position information relating to a second axis (the Y axis), and position information relating to a third axis (the Z axis). The direction information is information relating to a position in a rotation direction around the first axis (the X axis), information relating to a position in a rotation direction around the second axis (the Y axis), and information relating to the position in a rotation direction around the third axis (the Z axis).

As described above, in the position/posture acquiring process, under the control of the control unit 21, emission of measurement light L1 to each of the three reflective elements (the reflective elements 41, 42, and 43) is repeatedly performed by the emission unit 201.

In the measurement device 1, in the process of measurement, even in a case in which the measurement light L1 disappears, the emission unit 201 can be driven by the emission direction driving unit 204 such that measurement light is emitted to three reflective elements (the reflective elements 41, 42, and 43) with accuracy of the sub-micrometer order by the optical comb interferometer 11. For example, the case in which the measurement light L1 disappears is a case in which an obstacle is continuously present between the measurement device 1 and the target member 4 or the like.

Figure 28:
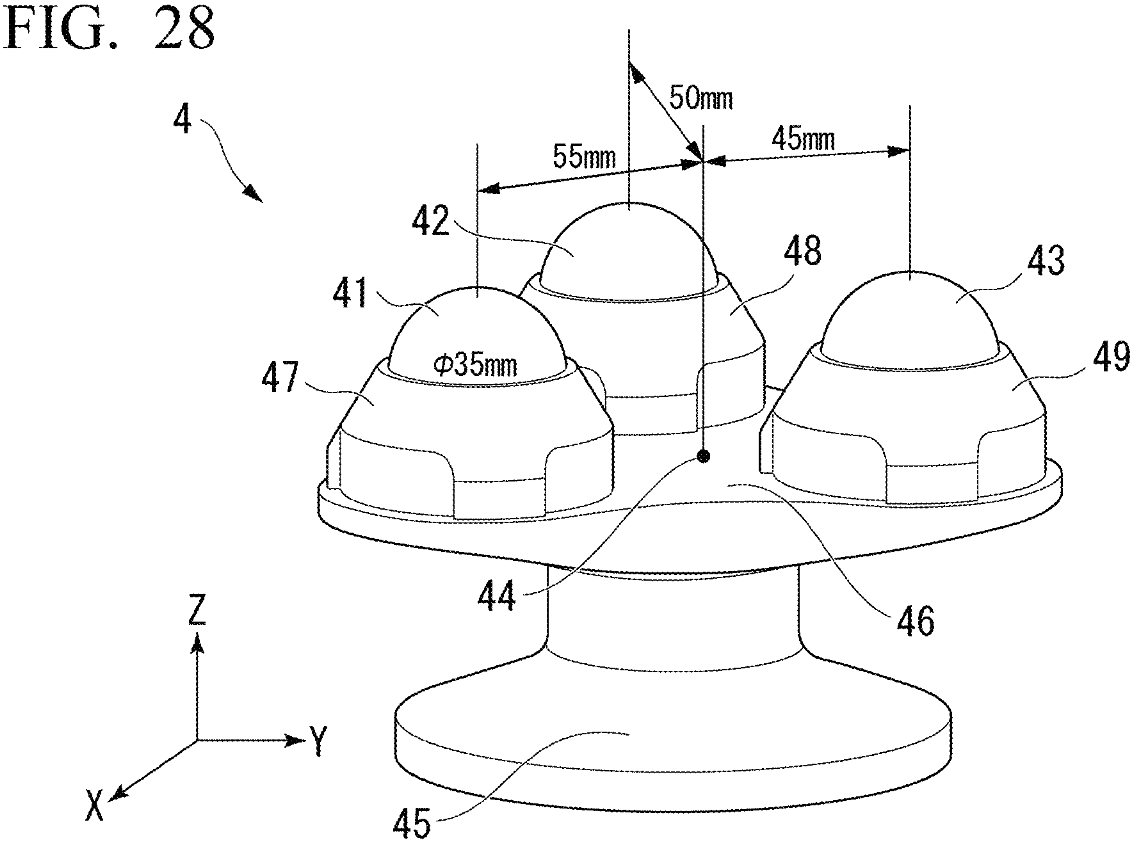
FIG. 28 is a diagram illustrating one example of the configuration of a target member according to the first embodiment.

Next, the configuration of the target member 4 will be described with reference to FIGS. 28 to 30. FIG. 28 is a diagram illustrating one example of the configuration of the target member 4 according to this embodiment. On an installation face 46 of an installation member 45, holding parts 47, 48, and 49 are disposed. The holding part 47 is a member that holds the reflective element 41. The reflective element 41 is held in the holding part 47 and is disposed on the installation face 46. The holding part 48 is a member that holds the reflective element 42. The reflective element 42 is held in the holding part 48 and is disposed on the installation face 46. The holding part 49 is a member that holds the reflective element 43. The reflective element 43 is held in the holding part 49 and is disposed on the installation face 46. In addition, the installation face 46 may be a flat face.

The marker 44 is disposed on the installation face 46. The marker 44 is disposed at a position closer to the center of the installation face 46 than the positions at which the three reflective elements (the reflective elements 41, 42, and 43) are disposed on the installation face 46. In other words, the marker 44 is disposed to be surrounded by the three reflective elements (the reflective elements 41, 42, and 43) on the installation face 46. In addition, the marker 44 may be disposed in any one of the holding parts 47, 48, and 49.

Figure 29:
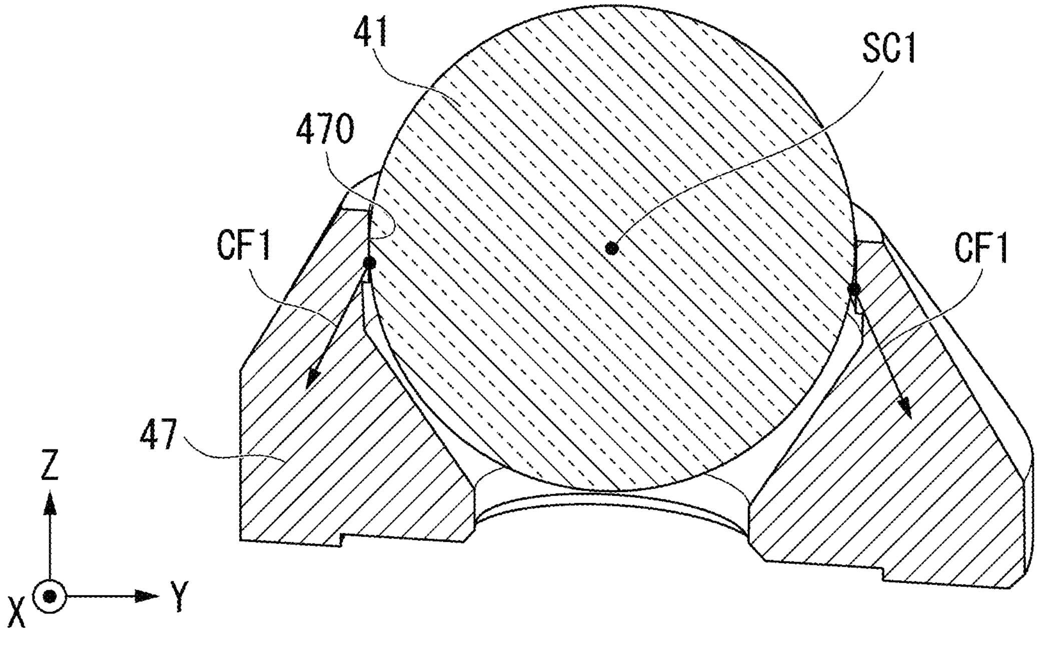
FIG. 29 is a diagram illustrating one example of a cross-sectional view of a state in which a reflective element according to the first embodiment is held in a holding part.
Figure 30:
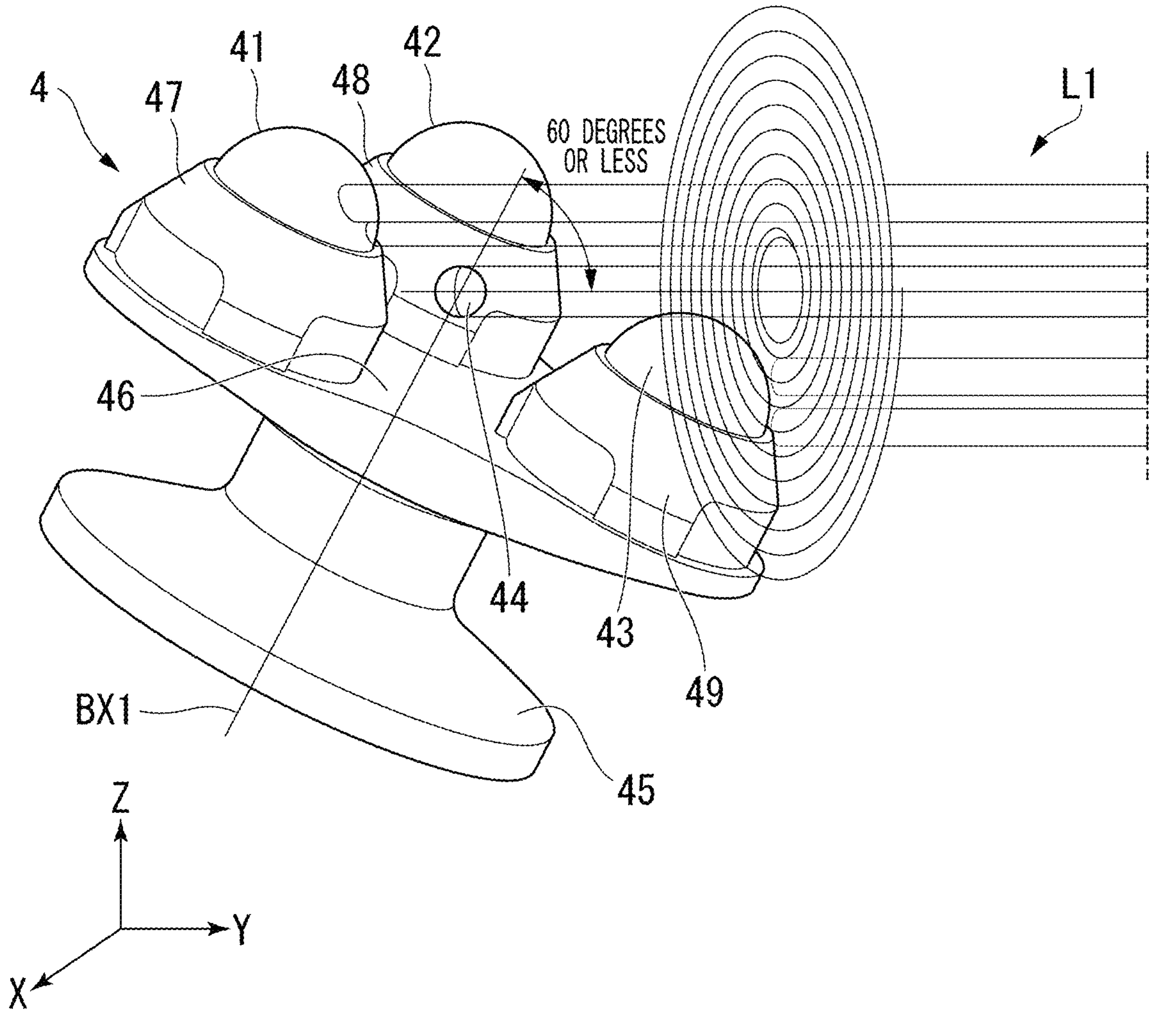
FIG. 30 is a diagram illustrating one example of heights of three reflective elements on an installation face according to the first embodiment.

FIG. 29 illustrates a cross-sectional view of a state in which the reflective element 41 is held in the holding part 47. The shape of the reflective element 41 is a sphere as one example. The center SC1 represents the center of the reflective element 41 having a sphere shape. Each of the shape of the reflective element 42 and the shape of the reflective element 43 is a sphere that is the same as the shape of the reflective element 41. The sizes of the reflective elements 41, 42, and 43 are the same. Each of a state in which the reflective element 42 is held in the holding part 48 and a state in which the reflective element 43 is held in the holding part 49 is similar to the state in which the reflective element 41 is held in the holding part 47.

Here, each of the three reflective elements (the reflective elements 41, 42, and 43) is one example of each of a first reflective element, a second reflective element, and a third reflective element. A position of the center SC1 of the reflective element 41 in the state in which the reflective element 41 is held in the holding part 47 will be referred to as a first position as a position at which the reflective element 41 is disposed in the target member 4. Similarly, a position of the center of the reflective element 42 in the state in which the reflective element 42 is held in the holding part 48 will be referred to as a second position as a position at which the reflective element 42 is disposed in the target member 4. A position of the center SC1 of the reflective element 43 in the state in which the reflective element 43 is held in the holding part 49 will be referred to as a third position as a position at which the reflective element 43 is disposed in the target member 4.

In this embodiment, a first side joining the first position at which the reflective element 41 is disposed and the second position at which the reflective element 42 is disposed, a second side joining the second position and the third position at which the reflective element 43 is disposed, and a third side joining the third position and the first position have mutually-different lengths. In addition, the first to third positions may be respectively set as the center positions of the reflective elements 41, 42, and 43.

In addition, the first to third positions may be set as positions other than the center positions of the reflective elements 41, 42, and 43. For example, the first to third positions may be positions at which perpendicular lines drawn down from the center positions of the reflective elements 41, 42, and 43 to the installation face intersect with the installation face. As another example, the first to third positions may be predetermined positions deviating from the centers of the reflective elements 41, 42, and 43 as long as the predetermined positions are positions included on the inner sides of the reflective elements 41, 42, and 43. As another example, the first to third positions may be positions on the outer sides of the reflective elements 41, 42, and 43 as long as the positions are positions (that is, predetermined relative positions) determined in advance for the reflective elements 41, 42, and 43.

As described above, by emitting the measurement light L1 along the circular orbit TC1, the measurement device 1 acquires positions of three reflective elements (the reflective elements 41, 42, and 43). There are cases in which, by only acquiring the positions of three reflective elements (the reflective elements 41, 42, and 43), the three reflective elements (the reflective elements 41, 42, and 43) cannot be identified from each other. For example, in a case in which three reflective elements (the reflective elements 41, 42, and 43) are disposed at positions of the same distance from the position of the marker 44 on the installation face 46, by only acquiring the positions of the three reflective elements (the reflective elements 41, 42, and 43), the three reflective elements (the reflective elements 41, 42, and 43) cannot be identified from each other.

In this embodiment, since the lengths of the first side, the second side, and the third side are different from each other, by fitting a known coordinate system to the three reflective elements (the reflective elements 41, 42, and 43), these three reflective elements can be identified from each other.

In addition, in the example illustrated in FIG. 28, the first position, the second position, and the third position are located on concentric circles on the installation face 46. A position of the center of the concentric circles is a predetermined position on the installation face 46 that is different from the position of the marker 44.

In addition, on the installation face 46, a distance between the center of the reflective element 41 and the marker 44, a distance between the center of the reflective element 42 and the marker 44, and a distance between the center of the reflective element 43 and the marker 44 are different from each other. The three reflective elements (the reflective elements 41, 42, and 43) may be identified from each other on the basis of a distance from the marker 44.

In addition, in the target member 4, the length of the first side, the length of the second side, and the length of the third side may be configured to be changeable. For example, on the installation face 46, a sliding plate-shaped member is disposed for each of the three reflective elements (the reflective elements 41, 42, and 43), and each of the three reflective elements (the reflective elements 41, 42, and 43) is attached to this plate-shaped member. By causing the plate-shaped members to slide, the length of the first side, the length of the second side, and the length of the third side can be changed. In addition, on the installation face 46, a plurality of attachment positions are provided for each reflective element, and by changing the plurality of attachment positions for each reflective element, the length of the first side, the length of the second side, and the length of the third side may be configured to be changeable.

The description will be continued by referring back to FIG. 29. A groove 470 is provided in the holding part 47. The groove 470 is a groove for filling with an adhesive material. The groove 470 is a groove having a shape of a ring form. The reflective element 41 is held with being bonded to the holding part 47 using the adhesive material filling the groove 470. Here, in accordance with hardening of the adhesive material, a cohesive force is generated. A vector CFI is a vector that represents this cohesive force.

In addition, the installation member 45 is a member for attaching the target member 4 to the robot T1. The installation member 45, as one example, is fixed to the robot T1 through a screw hole (not illustrated) using a screw. Thus, the target member 4 can be attached to a measurement target. The installation member 45 may be attached to the robot T1 using an adhesive tape, an adhesive material, a magnet or the like.

Next, heights of three reflective elements (the reflective elements 41, 42, and 43) on the installation face 46 will be described with reference to FIG. 30. FIG. 30 is a diagram illustrating one example of heights of three reflective elements (the reflective elements 41, 42, and 43) on the installation face 46 according to this embodiment. An axis BX1 is an axis in a direction perpendicular to the installation face 46 and is an axis passing though the position of the marker 44. The axis BX1 represents the orientation of the installation face 46.

The three reflective elements (the reflective elements 41, 42, and 43) are arranged at heights at which the marker 44 is not hidden in a case in which the orientation of the installation face 46 is orientation for which a smaller angle among angles formed by the axis BX1 and the emission direction of the measurement light L1 is a predetermined angle or less. In other words, the emission direction of the measurement light L1 is a direction in which the target member 4 is seen from the measurement device 1. The predetermined angle is 60 degrees as one example.

Thus, the three reflective elements (the reflective elements 41, 42, and 43), in the state of being attached to the target member 4, are arranged at heights for which the marker 44 is not hidden in the case of being seen from predetermined orientation.

In addition, in this embodiment, although one example of a case in which the target member 4 to which three reflective elements (the reflective elements 41, 42, and 43) are attached is attached to the robot T1 has been described, the configuration is not limited thereto. The three reflective elements (the reflective elements 41, 42, and 43) may be attached to the robot T1. In a case in which the three reflective elements (the reflective elements 41, 42, and 43) are attached to the robot T1, the three reflective elements (the reflective elements 41, 42, and 43) are attached to parts of the robot T1 for which the three reflective elements (the reflective elements 41, 42, and 43) enters the inside of the visual field of the measurement device 1 in a case in which the robot T1 is seen from the measurement device 1.

In a case in which the three reflective elements (the reflective elements 41, 42, and 43) are attached to the target member 4, the arrangement of the three reflective elements (the reflective elements 41, 42, and 43) is known in accordance with the structure of the target member 4. In a case in which the three reflective elements (the reflective elements 41, 42, and 43) are attached to the robot T1, it cannot be determined that the arrangement of the three reflective elements (the reflective elements 41, 42, and 43) is known. For this reason, the arrangement of the three reflective elements (the reflective elements 41, 42, and 43) is acquired through scanning after the three reflective elements (the reflective elements 41, 42, and 43) are attached to the robot T1. In this scanning, the first imaging unit 22 images at least a part of the robot T1 to which the three reflective elements (the reflective elements 41, 42, and 43) are attached. The arrangement of the three reflective elements (the reflective elements 41, 42, and 43) acquired through scanning is stored in the storage unit 24 as reflective element arrangement information.

As described above, the first imaging unit 22 images at least a part of the three reflective elements (the reflective elements 41, 42, and 43). Thus, the first imaging unit 22 images at least one of at least a part of the three reflective elements (the reflective elements 41, 42, and 43) and at least a part of the robot described above.

As described above, the measurement device 1 according to this embodiment is a measurement device that measures a position of the movable robot T1 and a position thereof in the rotation direction and includes the emission unit 201, the light receiving unit 202, and the position acquiring unit 206.

The emission unit 201 can emit measurement light L1 to each of at least three reflective elements (the reflective elements 41, 42, and 43 in this embodiment) attached to the robot T1.

The light receiving unit 202 can receive reflection light reflected by the three reflective elements (the reflective elements 41, 42, and 43 in this embodiment).

On the basis of light reception results acquired by the light receiving unit 202, the position acquiring unit 206 acquires position information relating to the first axis (the x axis in this embodiment) of the robot T1, position information relating to the second axis (the y axis in this embodiment) intersecting with the first axis (the x axis in this embodiment), and position information relating to the third axis (the z axis in this embodiment) intersecting with the first axis (the x axis in this embodiment) and the second axis (the y axis in this embodiment) and information relating to a position in the rotation direction around the first axis (the x axis in this embodiment), information relating to a position (position information in this embodiment) in the rotation direction around the second axis (the y axis in this embodiment), and information relating to a position (direction information in this embodiment) in the rotation direction around the third axis (the z axis in this embodiment).

By employing this configuration, the measurement device 1 according to this embodiment can acquire information relating to position information and a position in the rotation direction on the basis of light reception results of reflection light acquired in accordance with reflection of measurement light L1 emitted to at least three reflective elements attached to the robot T1 on the three reflective elements and thus can ensure the position and the posture of the robot T1 with high accuracy in control of the robot T1.

Second Embodiment

Hereinafter, a second embodiment of the present invention will be described in detail with reference to the drawings.

In the first embodiment described above, a case in which the position and the posture of the robot T1 are not changed while the measurement device 1 is performing the measurement process has been described. In this embodiment, a case in which a measurement process using a measurement device 1 is repeatedly performed during movement of a robot T1 will be described.

Figure 31:
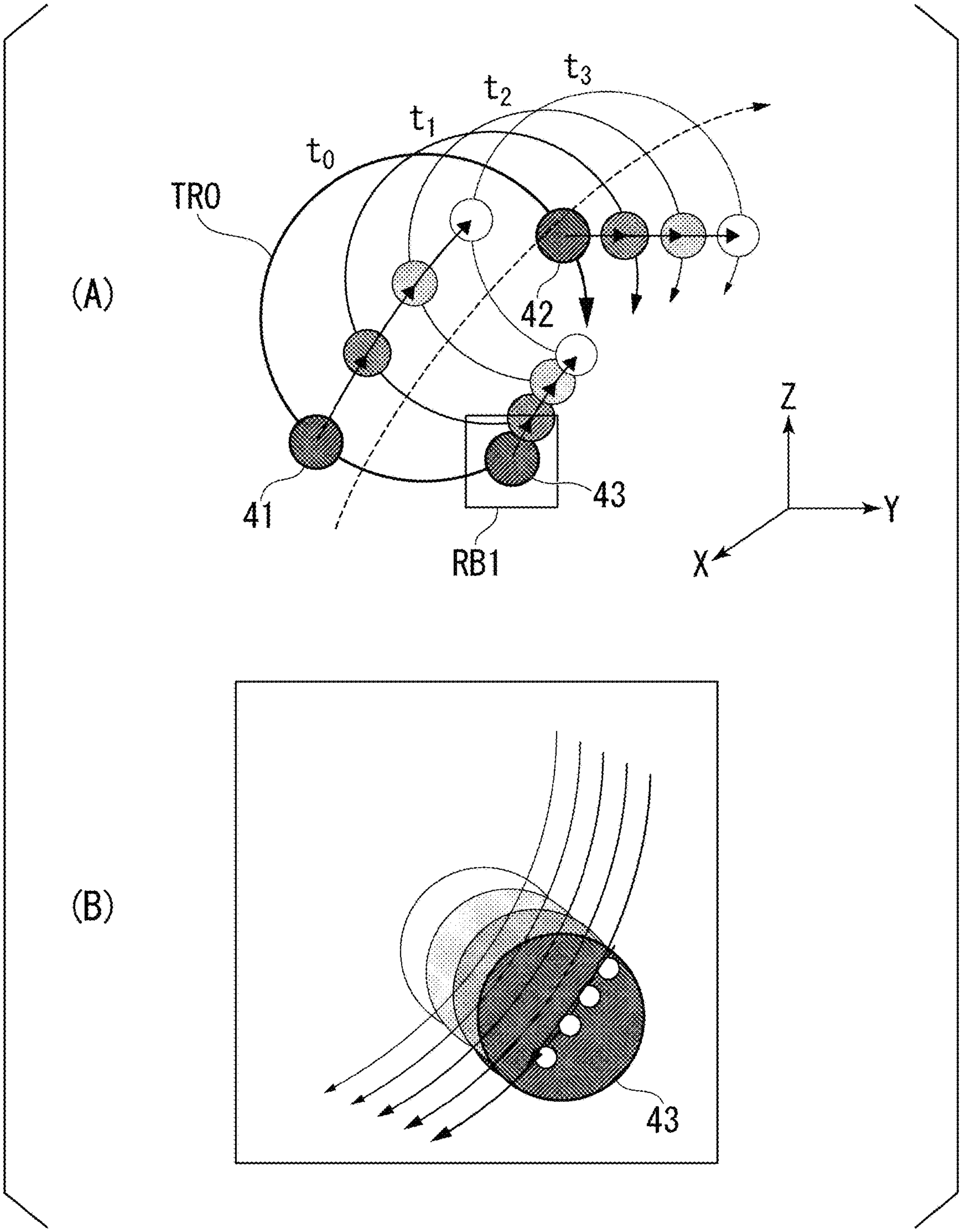
FIG. 31 illustrates one example of an appearance in which a position and a posture are measured using measurement light in a case in which a measurement target according to a second embodiment moves.

FIG. 31 illustrates one example of an appearance in which a position and a posture are measured using measurement light L1 in a case in which a measurement target according to this embodiment moves. The robot T1 is assumed to stop until a time t0 and start movement at a time t0. In accordance with this, three reflective elements (reflective elements 41, 42, and 43) included in a target member 4 attached to the robot T1 stop until the time t0 and start movement at the time t0.

An orbit TR0 illustrated in FIG. 31(A) is a circular orbit calculated for a position/posture acquiring process on the basis of positions (that is, a first position, a second position, and a third position) of centers of the three reflective elements (the reflective elements 41, 42, and 43) in a case in which the target member 4 stops. In other words, the orbit TR0 is a circular orbit calculated before the time t0.

While sequentially emitting measurement light L1 along the orbit TR0 to the three reflective elements (the reflective elements 41, 42, and 43), the measurement device 1 calculates a time change of the position of each of these three reflective elements (the reflective elements 41, 42, and 43). The measurement device 1, for example, sequentially calculates a direction vector for each of the three reflective elements (the reflective elements 41, 42, and 43) on the basis of the position of the reflective element detected by a 4-division PSD 12. This direction vector represents a time change of the position of the reflective element.

FIG. 31(B) illustrates an appearance in which reflection light acquired in accordance with reflection of measurement light L1 on the reflective element is detected by the 4-division PSD 12. In FIG. 31(B), a range RB1 illustrated in FIG. 31(A) is illustrated as being expanded, and, as one example, an appearance in which reflection light acquired in accordance with reflection of measurement light L1 emitted to the reflective element 43 is detected by the 4-division PSD 12 is illustrated.

The measurement device 1 calculates a circular orbit that can pass through the three reflective elements (the reflective elements 41, 42, and 43) at a time t1 on the basis of a time change (a direction vector) of the position of each of the three reflective elements (the reflective elements 41, 42, and 43) that has been detected at the time t0. Here, the time t1 is a time after a predetermined time from the time t0. Similarly, also at subsequent times (a time t1, a time t2, and a time t3 in FIG. 31), the measurement device 1 calculates a circular orbit that can pass through the three reflective elements (the reflective elements 41, 42, and 43) at each time.

Figure 32:
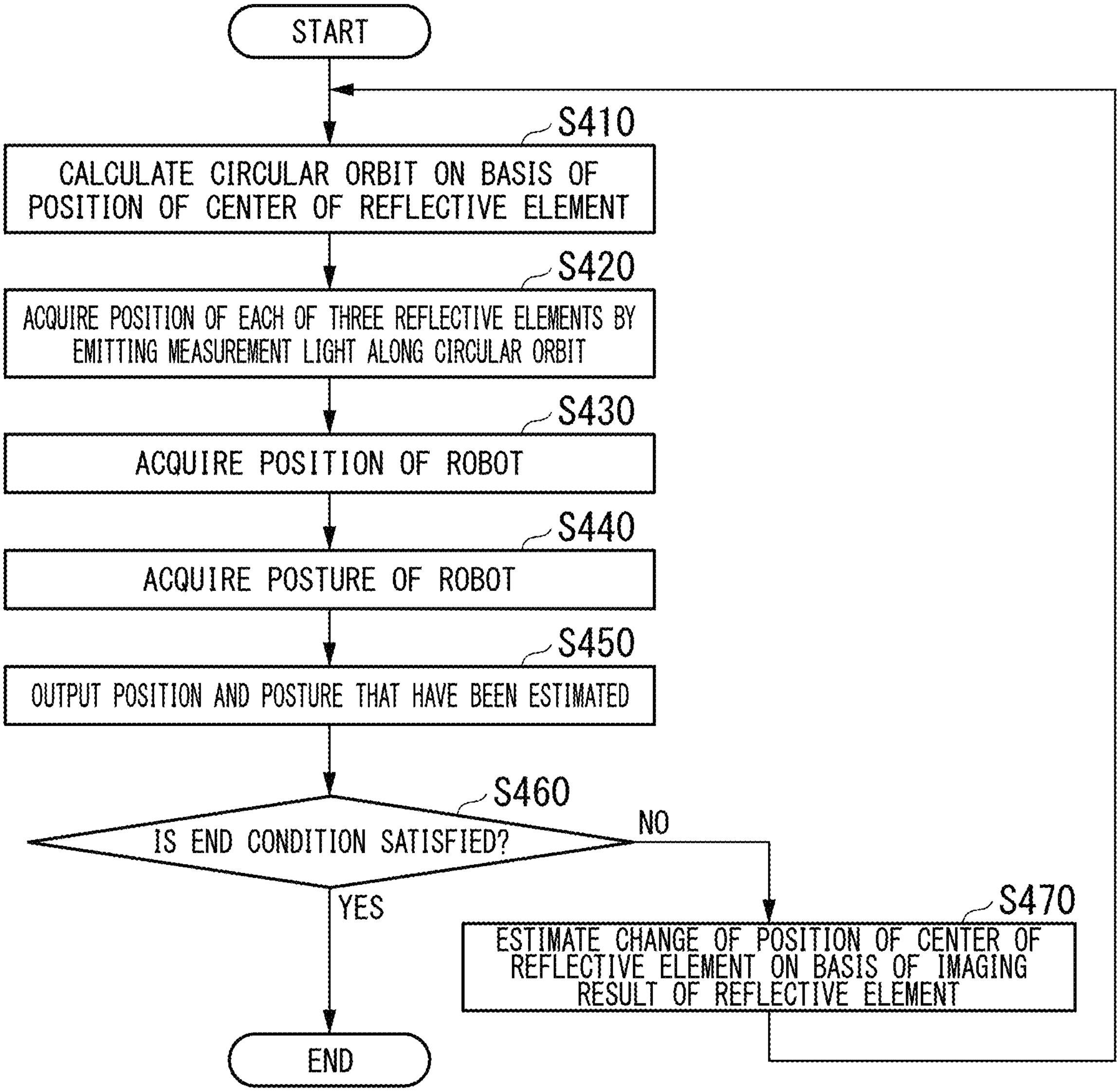
FIG. 32 is a diagram illustrating one example of a position/posture acquiring process according to the second embodiment.

Next, a position/posture acquiring process of a case in which a measurement target moves will be described with reference to FIG. 32. FIG. 32 is a diagram illustrating one example of a position/posture acquiring process according to this embodiment. The position/posture acquiring process illustrated in FIG. 32 is executed as Step S30 in the measurement process illustrated in FIG. 10. For example, the position/posture acquiring process illustrated in FIG. 32 is performed every time a position to which the measurement light L1 is emitted orbits a predetermined number of times along a circular orbit. For example, this predetermined number of times is one. In addition, this predetermined number of times may be two or more.

In addition, processes of Step S410, Step S420, Step S430, Step S440, and Step S450 are similar to the processes of Step S310, Step S320, Step S330, Step S340, and Step S350 illustrated in FIG. 23, and thus description thereof will be omitted.

Step S460: A position acquiring unit 206 determines whether or not an end condition is satisfied. For example, the end condition is acquisition of a signal (a command) for ending a measurement process in the measurement device 1. For example, this signal is supplied from an external device to the measurement device 1 on the basis of an operation performed by a user of the measurement device 1. An operation accepting unit may be included in the measurement device 1, and this signal may be supplied to the measurement device 1 on the basis of a user's operation received by the operation accepting unit. The end condition may be elapse of a predetermined time after the measurement device 1 starts the measurement process.

In a case in which the position acquiring unit 206 determines that the end condition is satisfied (Step S460: Yes), the control unit 21 ends the position/posture acquiring process. On the other hand, in a case in which it is determined that the end condition is not satisfied (Step S460: No), the position acquiring unit 206 executes the process of Step S470.

Step S470: The position acquiring unit 206 estimates a change of the position of the center of a reflective element on the basis of an imaging result of the reflective element. The imaging result of the reflective element is a result of detection of reflection light reflected from the reflective element to which the measurement light L1 has been emitted in the 4-division PSD 12. The position acquiring unit 206 calculates a direction vector representing a change of the position of the center of a reflective element on the basis of the position of the center of the reflective element represented by an imaging result of a reflective element that has been newly acquired and a position of the center of the reflective element represented by an imaging result of a reflective element that has been acquired in the previous time. The position acquiring unit 206 estimates a change of the position of the center of the reflective element on the basis of the calculated direction vector.

Thereafter, the position acquiring unit 206 executes the process of Step S410 again. In the process of Step S410 that is executed again, the position acquiring unit 206 calculates a circular orbit TC1 on the basis of the position of the center of the reflective element that is based on a change of the position of the center of the reflective element that has been estimated in Step S470.

As described above, in the position/posture acquiring process according to this embodiment, the circular orbit TC1 is calculated for every predetermined time on the basis of a change of the position of the center of each of the three reflective elements (the reflective elements 41, 42, and 43). Since the circular orbit TC1 is calculated for every predetermined time on the basis of a change of the position of the center of each of the three reflective element, the emission unit 201 sequentially emits measurement light L1 to each of the three reflective elements while scanning along a predetermined orbit such that it follows the movement of the three reflective elements (the reflective elements 41, 42, and 43). During movement of the robot T1, emission of the measurement light L1 to each of the three reflective elements (the reflective elements 41, 42, and 43) is repeatedly performed. In accordance with this, even during the movement of the robot T1, the position and the posture of the robot T1 can be continuously acquired.

In addition, in each embodiment described above, although one example of a case in which the measurement light L1 is emitted on the basis of results of imaging (that is, results of a rough search) of the three reflective elements (the reflective elements 41, 42, and 43) that is performed using the first imaging unit 22 has been described, the method of the rough search is not limited thereto.

In addition, the measurement device 1, instead of performing a rough search, may acquire information representing a position and a posture of the robot T1 from the control system of the robot T1 and acquire positions of the three reflective elements (the reflective elements 41, 42, and 43) with rough accuracy on the basis of the attachment position information and the reflective element arrangement information. In addition, information representing a position and a posture of the robot T1 that is acquired from the control system represents the position and the posture of the robot T1 with rough accuracy.

Also in any one of the cases described above, the measurement device 1 performs the process of a fine search on the basis of the acquired positions of the three reflective elements (the reflective elements 41, 42, and 43). In other words, the measurement light L1 is emitted on the basis of imaging results acquired by the imaging units (the first imaging unit 22 and the second imaging unit 30).

In addition, in each of the embodiments described above, other than the description of the posture acquiring process, although one example of a case in which the position and the posture of the robot T1 are measured on the basis of the position of each of the three reflective elements (the reflective elements 41, 42, and 43) has been described, the present invention is not limited thereto. Four or more reflective elements may be attached to the target member 4, and the measurement device 1 may measure the position and the posture of the robot T1 on the basis of results of measurement of positions of the four or more reflective elements. Here, in order to measure the position and the posture of the robot T1, it is sufficient to measure the position of each of three reflective elements. In a case in which positions of four or more reflective elements are measured, for example, a measurement result of the position of one reflective element among four reflective elements may be used for verifying measurement results of the position and the posture of the robot T1 that have been measured on the basis of the positions of three reflective elements among the four reflective elements. In that case, for example, the position and the posture of the robot T1 are measured for verification on the basis of any two out of three reflective elements among four reflective elements used for measurement and one reflective element used for verification. By judging whether or not the position and the posture of the robot T1 that have been measured for verification and the position and the posture of the robot T1 that have been measured for measurement coincide with each other with predetermined accuracy, measurement results for measurement are verified.

In addition, the position and the posture of the robot T1 may be measured on the basis of an average value of measurement results of positions of four or more reflective elements. For example, six reflective elements are divided into two sets, and a result of calculation of an average value for a set from measurement results of the position and the posture of the robot T1 that have been measured on the basis of the position of each of three reflective elements for each set may be regarded as a measurement result.

In addition, in the measurement device 1 according to each of the embodiments described above, although one example of a case in which the emission unit 201 includes one optical comb interferometer 11 and sequentially emits the measurement light L1 to each of a plurality of reflective elements has been described, the present invention is not limited thereto. As described above, the emission unit 201 may include a plurality of optical comb interferometers. In a case in which the emission unit 201 includes a plurality of optical comb interferometers, similar to each of the embodiments described above, some of the plurality of optical comb interferometers may be used for sequentially emitting measurement light to each of the plurality of reflective elements, and each of the other remaining optical comb interferometers among the plurality of optical comb interferometer may be used for emitting measurement light to one reflective element associated therewith among reflective elements corresponding to the same number as the number of the other remaining optical comb interferometers.

Particularly, the emission unit 201 may include optical comb interferometers 11 corresponding to the same number as the number of the plurality of reflective elements. In a case in which the emission unit 201 includes optical comb interferometers corresponding to the same number as the number of the plurality of reflective elements, the emission unit 201 emits measurement light generated from the optical comb interferometers corresponding to the same number as the number of the plurality of reflective elements to each of the plurality of reflective elements.

In addition, in the measurement device 1 according to each of the embodiments described above, although one example of a case in which position information and information relating to a position in the rotation direction (direction information) are acquired has been described, the present invention is not limited thereto. The measurement device 1 may acquire only position information out of the position information and the direction information. In a case in which the measurement device 1 acquires only position information out of the position information and the direction information, direction information may be calculated by an arithmetic operation device separated from the measurement device 1 on the basis of the position information acquired by the measurement device 1.

In addition, the measurement device 1, the robot T1, and the control system of the robot T1 according to each of the embodiments described above can be included in a robot system and are used appropriately in a production site such as a factory.

In addition, the measurement device 1 according to each of the embodiments described above is used appropriately in a management method for managing the robot T1 using the measurement device 1.

In addition, a part of the measurement device 1 according to the embodiment described above, for example, the position acquiring unit 206 and the control unit 21 may be realized by a computer. In that case, by recording a program for realizing this control function on a computer-readable recording medium and causing a computer system to read and execute this program recorded on the recording medium, the position acquiring unit 206 and the control unit 21 may be realized. In addition, the "computer system" described here is a computer system built into the measurement device 1 and is assumed to include an OS and hardware such as peripherals. Furthermore, the "computer-readable recording medium" represents a portable medium such as a flexible disk, a magneto-optical disk, a ROM, or CD-ROM or a storage device such as a hard disk built into the computer system. Furthermore, the "computer-readable recording medium" may include a medium dynamically storing the program for a short time such as a communication line of a case in which the program is transmitted through a network such as the Internet or a communication circuit line such as a telephone line and a medium storing the program for a predetermined time such as an internal volatile memory of the computer system that becomes a server or a client in such a case. In addition, the program described above may be a program used for realizing a part of the function described above or a program that can realize the function described above in combination with a program that is already recorded in the computer system.

In addition, a part or the whole of the measurement device 1 according to the embodiment described above may be realized as an integrated circuit such as a large-scale integration (LSI). Each functional block of the measurement device 1 may be individually implemented as a processor, or a part or the whole may be integrated to be implemented as a processor. In addition, a technique for implementing an integrated circuit is not limited to the LSI and may be realized using a dedicated circuit or a general-purpose processor. Furthermore, in a case in which an integrated circuit technology replacing the LSI emerges in accordance with the progress of semiconductor technologies, an integrated circuit using this technology may be used as well.

As above, although the embodiment of the present invention has been described in detail with reference to the drawings, a specific configuration is not limited to that described above, and various design changes and the like can be made in a range not departing from the concept of the present invention.

REFERENCE SIGNS LIST

1 Measurement device
201 Emission unit
202 Light receiving unit
206 Position acquiring unit
T1 Robot
41, 42, 43 Reflective element
L1 Measurement light

What is claimed is:

1. A measurement device measuring a position of a movable robot and a position of the robot in a rotation direction, the measurement device comprising:

a light source configured to emit measurement light to each of at least three reflective elements attached to the robot;

a photodetector configured to receive reflection light reflected on each of the three reflective elements; and circuitry configured to acquire position information relating to a first axis of the robot, position information relating to a second axis intersecting with the first axis, and position information relating to a third axis intersecting with the first axis and second axis and information relating to a position in a rotation direction around the first axis, information relating to a position in a rotation direction around the second axis, and information relating to a position in a rotation direction around the third axis on the basis of light reception results acquired by the photodetector.

2. The measurement device according to claim 1, further comprising a position sensitive detector configured to image at least one of at least some of the three reflective elements and at least a part of the robot, wherein the measurement light is emitted on the basis of imaging results acquired by the position sensitive detector.

3. The measurement device according to claim 1, further comprising a position sensitive detector configured to image a marker disposed at a predetermined position with respect to the three reflective elements, wherein the measurement light is emitted on the basis of an imaging result acquired by the position sensitive detector.

4. The measurement device according to claim 1, wherein the optical interferometer is configured to scan the measurement light along a predetermined orbit that can pass through the three reflective elements.

5. The measurement device according to claim 4, wherein, in order to perform scanning along the predetermined orbit, an orbit for which a change in acceleration due to change in the emission direction of the measurement light becomes small is calculated as the predetermined orbit.

6. The measurement device according to claim 4, wherein an elliptical orbit is calculated as the predetermined orbit.

7. The measurement device according to claim 1, further comprising a control device controlling the measurement device, wherein the control device calculates an orbit of the measurement light passing through the three reflective elements on the basis of measurement results, which are measurement results acquired by the circuitry, acquired using the measurement light scanning a predetermined range along an orbit having a spiral shape.

8. The measurement device according to claim 1, wherein the optical interferometer is configured to emit an optical comb as the measurement light.

9. The measurement device according to claim 1, wherein the optical interferometer is configured to sequentially emit the measurement light to each of the three reflective elements while scanning with a predetermined speed or more along a predetermined orbit.

10. The measurement device according to claim 1, wherein the optical interferometer sequentially emits the measurement light to each of the three reflective elements while scanning along a predetermined orbit to follow movement of the three reflective elements.

11. The measurement device according to claim 1, wherein emission of the measurement light to each of the three reflective elements is repeatedly performed.

12. The measurement device according to claim 11, wherein the emission of the measurement light to each of the three reflective elements is repeatedly performed during movement of the robot.

13. The measurement device according to claim 1, wherein the optical interferometer emits the measurement light to each of the three reflective elements through a reflection face of a movable mirror, and wherein the photodetector receives reflection light from each of the three reflective elements through the reflection face.

14. The measurement device according to claim 1, wherein the position information relating to the first axis, the position information relating to the second axis, and the position information relating to the third axis, and the information relating to a position in the rotation direction around the first axis, the information relating to a position in the rotation direction around the second axis, and the information relating to a position in the rotation direction around the third axis are acquired on the basis of information relating to positions of the three reflective elements.

15. The measurement device according to claim 1, wherein the three reflective elements are a first reflective element, a second reflective element, and a third reflective element, a first side joining a first position at which the first reflective element is disposed and a second position at which the second reflective element is disposed, a second side joining the second position and a third position at which the third reflective element is disposed, and a third side joining the third position and the first position have mutually-different lengths, and the first position, the second position, and the third position are located on concentric circles.

16. The measurement device according to claim 1, wherein the circuitry is configured to acquire information relating to a tool center point of the robot.

17. The measurement device according to claim 1, wherein the circuitry configured to acquire position information of the at least three reflective elements based on direction information of the at least three reflective elements obtained from the emission direction of the measurement light and based on distance information of the at least three reflective elements obtained from light receiving results of the light receiving apparatus.

18. The measurement device according to claim 17, wherein the circuitry configured to use the direction information of the at least three reflective elements without the distance information of the at least three reflective elements during a period in which the emission direction of the measurement light is changed by the emission direction changing apparatus and the measurement light emits toward the at least three reflective elements.

19. The measurement device according to claim 17, further comprising an emission direction measuring apparatus which measures the emission direction of the measurement light.

20. The measurement device according to claim 19, wherein the light receiving apparatus including a first light receiver and a second light receiver, wherein the direction information is obtained from a light receiving result of the first receiver, and wherein the distance information is obtained from a light receiving result of the second receiver.

21. A target member comprising a first reflective element, a second reflective element, and a third reflective element to which measurement light is emitted for acquiring position information relating to a first axis, position information relating to a second axis intersecting with the first axis, and position information relating to a third axis intersecting with the first axis and second axis, and information relating to a position in a rotation direction around the first axis, information relating to a position in a rotation direction around the second axis, and information relating to a position in a rotation direction around the third axis for a movable measurement target, wherein the target member is configured to be attached to the movable measurement target, and wherein a first side joining a first position at which the first reflective element is disposed and a second position at which the second reflective element is disposed, a second side joining the second position and a third position at which the third reflective element is disposed, and a third side joining the third position and the first position have mutually-different lengths.

22. A measurement method measuring a position of a movable robot and a position of the robot in a rotation direction, the measurement method comprising:

emitting measurement light to each of at least three reflective elements attached to the robot;

receiving reflection light reflected on each of the three reflective elements; and acquiring, by circuitry, position information relating to a first axis of the robot, position information relating to a second axis intersecting with the first axis, and position information relating to a third axis intersecting with the first axis and second axis and information relating to a position in a rotation direction around the first axis, information relating to a position in a rotation direction around the second axis, and information relating to a position in a rotation direction around the third axis on the basis of light reception results acquired by the receiving of light.

* * * * *